(12) United States Patent
Kobayashi et al.

(10) Patent No.: US 7,141,326 B2
(45) Date of Patent: Nov. 28, 2006

(54) WARM-UP APPARATUS FOR FUEL CELL

(75) Inventors: Tomoki Kobayashi, Saitama (JP);
Yoshio Nuiya, Saitama (JP); Mitsuru Kai, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 507 days.

(21) Appl. No.: 10/117,362

(22) Filed: Apr. 5, 2002

(65) Prior Publication Data
US 2002/0146606 A1    Oct. 10, 2002

(30) Foreign Application Priority Data
Apr. 6, 2001  (JP)  ............... 2001-108106
Apr. 6, 2001  (JP)  ............... 2001-109105

(51) Int. Cl.
*H01M 8/04*   (2006.01)
*H01M 8/02*   (2006.01)
*H01M 8/00*   (2006.01)

(52) U.S. Cl. ............... 429/24; 429/22; 429/26; 429/13

(58) Field of Classification Search ............... 429/24, 429/22, 26, 13
See application file for complete search history.

(56) References Cited
U.S. PATENT DOCUMENTS

| | | | |
|---|---|---|---|
| 4,473,622 A | 9/1984 | Chludzinski et al. | |
| 5,845,479 A * | 12/1998 | Nakhamkin et al. | 60/777 |
| 5,976,722 A * | 11/1999 | Muller et al. | 429/13 |
| 6,068,941 A | 5/2000 | Fuller et al. | |
| 6,103,410 A | 8/2000 | Fuller et al. | 429/13 |
| 6,521,204 B1 | 2/2003 | Borup et al. | |
| 6,604,515 B1 * | 8/2003 | Marsh et al. | 123/563 |
| 6,635,372 B1 | 10/2003 | Gittleman | |
| 6,846,586 B1 * | 1/2005 | Aramaki | 429/22 |
| 2001/0050191 A1 * | 12/2001 | Ogawa et al. | 180/65.3 |
| 2002/0039672 A1 | 4/2002 | Aramaki | |
| 2003/0049504 A1 | 3/2003 | Wheat et al. | |
| 2003/0072984 A1 | 4/2003 | Saloka et al. | |

* cited by examiner

*Primary Examiner*—Patrick Joseph Ryan
*Assistant Examiner*—Angela J. Martin
(74) *Attorney, Agent, or Firm*—Lahive & Cockfield, LLP

(57) ABSTRACT

A warm-up apparatus GS for a fuel cell 1, 51 comprising: a compressor 22, 71 for feeding supply gas A to the fuel cell 1, 51; a main passage W1, W3 connecting the compressor 22, 71 and the fuel cell 1, 51 and feeding supply gas A; an intercooler 23, 73 arranged in the main passage W1, W3; and a bypass passage W2, W4 connecting the compressor 22, 71 and the fuel cell 1, 51 and feeding supply gas A in such a manner that the supply gas A bypasses the intercooler 23, 73.

15 Claims, 17 Drawing Sheets

(1ST EMBODIMENT)

TEMPERATURE-AIR FLOW RATE MAP

AIR FLOW RATE-OPENING DEGREE OF PRESSURE CONTROL VALVE MAP (FIRST MODIFICATION)

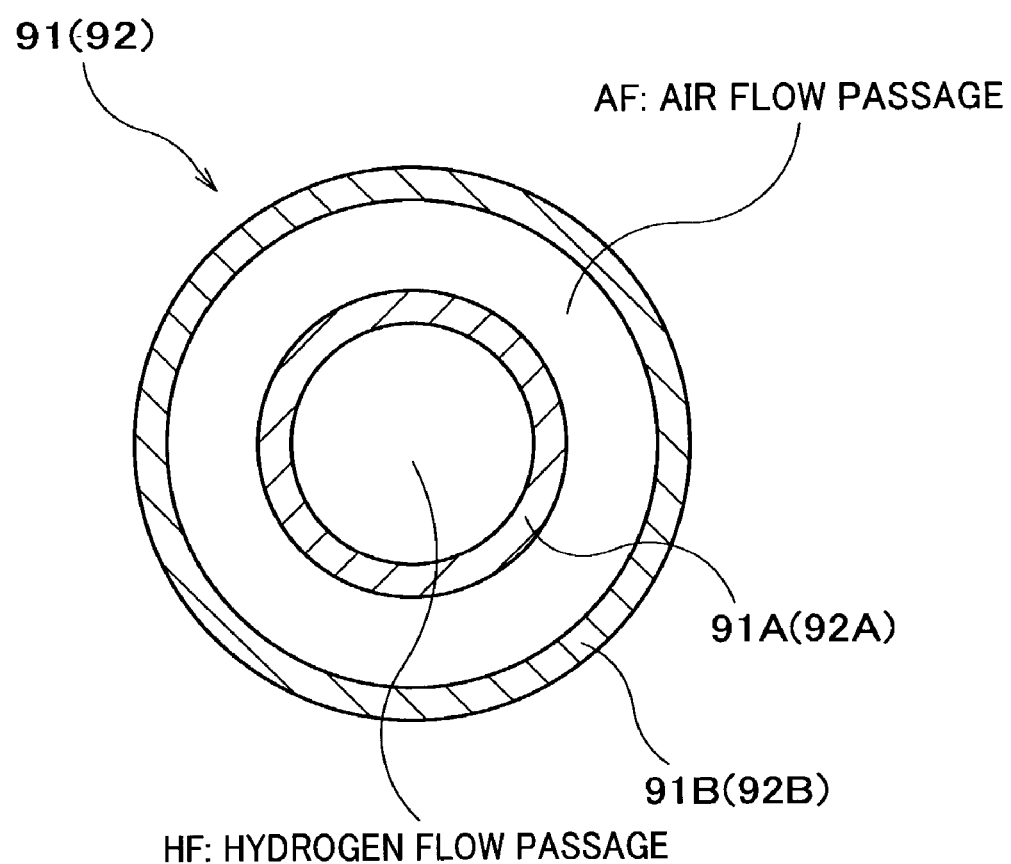

WARM-UP APPARATUS FOR FUEL CELL

FIELD OF THE INVENTION

The present invention relates to a warm-up apparatus for a fuel cell.

BACKGROUND OF THE INVENTION

In recent years, fuel cells have been focused as a power plant of electric vehicles because of its cleanness and excellent energy efficiency. In the fuel cell, oxygen is fed to the cathode and hydrogen is fed to the anode, and electricity is generated with the reaction between hydrogen and oxygen. For the purpose of supplying oxygen to the cathode, for example, a compressor is used to feed oxygen-containing air to the fuel cell.

Upon feeding oxygen-containing air to the fuel cell, the temperature of the air is raised by the compressive force of the compressor. The fuel cell efficiently generates electricity at a particular temperature range (80 to 90° C. in the case of polymer electrolyte fuel cell). However, air compressed by the compressor rises, for example, to 120° C. If air having such a high temperature is fed to the fuel cell, effective generation of electricity cannot be achieved. For this reason, air, before supplying to the fuel cell, passes through an intercooler and is cooled to a predetermined temperature, and thereafter the cooled air is fed to the fuel cell.

At the start of the fuel cell, the fuel cell is often cool, and effective generation of electricity is not achieved. Therefore, the fuel cell has to be heated (warmed up) instantly to a certain desired temperature at the actuation of the fuel cell. This is particularly important if the fuel cell is mounted on an electric vehicle.

In a conventional method, the fuel cell is heated by an electrical heater driven by a battery or commercially available power source or by a hydrogen-combustion heater such as disclosed in U.S. Pat. No. 6,103,410.

However, in the conventional method, since the electric heater or hydrogen-combustion heater is employed only for the purpose of warming up the fuel cell, consumption of electricity or hydrogen increases. And if the fuel cell is mounted on an automobile, running distance per unit fuel consumption decreases. In an electric heater employing a commercially available power source, there is a drawback in that electricity has to be introduced from the outside. Furthermore, the whole fuel cell system increases its size because there is a need to provide a dedicated electric heater or hydrogen-combustion heater.

If air temperature is low in a cold area or in the wintertime, the temperature of exhaust gas from the fuel cell is extremely low at the time of start up. In this instance, consumption of electricity or hydrogen will increase seriously for warming up the fuel cell. Furthermore, moisture in the fuel cell may be frozen below freezing temperature, which causes the fuel cell to generate little electricity. Therefore, it is necessary to warm up the fuel cell instantly.

In view of the above, a first object of the present invention is to provide a warm-up apparatus for a fuel cell, which enables quick warming-up of the fuel cell at the time of start up, and which does not require a dedicated electric heater or hydrogen-combustion heater.

Meanwhile, upon warming up the fuel cell, high-temperature air that is warmed by the compressor may be fed directly to the fuel cell. This allows the fuel cell to be warmed up instantly by the high-temperature air.

However, in a conventional method, high-temperature air is fed only to the cathode of the fuel cell. Therefore, the anode of the fuel cell is warmed up by heat that is transferred from the cathode through the membrane. For this reason, the anode is warmed up after the cathode, leading to a drawback that the whole fuel cell system takes time to complete a warm-up.

The anode of the fuel cell is also moisturized by an anode humidifier. Therefore, below freezing temperature, devices in the anode system are most likely frozen. However, since high-temperature air is fed from the compressor to the cathode of the fuel cell, warming-up is carried out merely for the cathode humidifier, and the anode circulation device and the anode humidifier are not warmed up at all.

In view of the above, a second object of the present invention is to provide a warm-up apparatus for a fuel cell, which enables warming-up of the fuel cell not only for devices in the cathode system but for devices in the anode system, and which enables warming-up for both the cathode and the anode to thereby warm up the whole fuel cell system quickly.

SUMMARY OF THE INVENTION

According to a first aspect of the present invention, there is provided a warm-up apparatus for a fuel cell comprising:

a compressor for feeding supply gas to the fuel cell;

a main passage connecting the compressor and the fuel cell and feeding supply gas and;

an intercooler arranged in the main passage; and a bypass passage connecting the compressor and the fuel cell and feeding supply gas in such a manner that the supply gas bypasses the intercooler.

In this warm-up apparatus, upon feeding supply gas from the compressor to the fuel cell, supply gas is cooled at the intercooler if it flows through the main passage, and the supply gas is not cooled if it flows through the bypass passage bypassing the intercooler. Therefore, during the normal driving which requires cooling supply gas, supply gas is fed through the main passage. On the other hand, at the start up of the fuel cell which requires a warming-up, supply gas is fed through the bypass passage to raise the temperature thereof and a warm supply gas is fed to the fuel cell. According to this warm-up apparatus, a warm supply gas is fed to the fuel cell at the time of start up. This enables quick warming-up of the fuel cell without requiring a dedicated electric heater or hydrogen-combustion heater.

In the aforementioned warm-up apparatus, a cross-sectional area of the bypass passage may be smaller than that of the main passage.

In this warm-up apparatus, the cross-sectional are of the bypass passage is set smaller than that of the main passage. Elevation in temperature of supply gas from the compressor is determined in accordance with the compression ratio of the compressor. The smaller the cross-sectional area of the passage into which supply gas from the compressor flows, the more does the compression ratio of the supply gas increase when supplying supply gas having the same flow rate. Temperature of supply gas increases as the compression ratio increases. For this reason, the cross-sectional area of the bypass passage into which supply gas flows at the time of warming-up is set smaller than that of the main passage for feeding supply gas during the normal operation, so that supply gas at a high temperature is fed to the fuel cell. Therefore, it is possible to warm up the fuel cell quickly.

In the aforementioned warm-up apparatus, supply gas may be fed either to the main passage or the bypass passage in accordance with a warming-up state of the fuel cell.

In this warm-up apparatus, supply gas is fed either to the main passage or the bypass passage in accordance with a warming-up state of the fuel cell. When the fuel cell is not warmed up yet, supply gas that is warmed and raised the temperature by the compressor is fed to the fuel cell. When the fuel cell is warmed up, supply gas is fed through the main passage. Supply gas having an elevated temperature is cooled at the intercooler and then fed to the fuel cell.

In the aforementioned warm-up apparatus, a flow rate adjustment device may be provided for adjusting a ratio of flow rates of supply gas, which passes through the main passage and the bypass passage.

In this warm-up apparatus, of the flows of supply gas toward the fuel cell, the flow rate of supply gas to be fed to the main passage and the flow rate of supply gas to be fed to the bypass passage are adjusted. When a warm-up of the fuel cell is not ready and the fuel cell is cool, all supply gas is fed to the bypass passage so that the temperature of supply gas is raised to warm up the fuel cell. Thereafter, when the fuel cell becomes warmer, a flow of supply gas is switched gradually from the bypass passage to the main passage. Accordingly, it is possible to feed supply gas having an appropriate temperature to the fuel cell until a warm-up of the fuel cell is completed from a state where the fuel cell is cool.

In the aforementioned warm-up apparatus, a flow rate of supply gas flowing through the bypass passage maybe adjusted in accordance with a warming-up state of the fuel cell.

In this warm-up apparatus, of the flows of supply gas toward the fuel cell, a flow rate of supply gas flowing through the bypass passage is adjusted in accordance with a warming-up state of the fuel cell. Accordingly, if a load of the fuel cell decreases during the drive of the fuel cell, and if the fuel cell requires a warm-up, in accordance with a state of the fuel cell, the flow rate of supply gas flowing through the bypass passage is adjusted. Therefore, although during the drive of the fuel cell, quick warming-up of the fuel cell is achieved.

In the aforementioned warm-up apparatus, the number of revolutions of the compressor may be controlled in accordance with a warming-up state of the fuel cell.

In this warm-up apparatus, the number of revolutions of the compressor is controlled in accordance with a warming-up state of the fuel cell. For example, by way of controlling the number of revolutions of the compressor when the temperature of supply gas at the input side of the fuel cell is elevated to a high temperature, such as 80° C. or more, the temperature of supply gas flowing toward the fuel cell is decreased. Accordingly, it is possible to supply to the fuel cell supply gas having a temperature suitable for generation of electricity.

According to a second aspect of the present invention, there is provided a warm-up apparatus for a fuel cell comprising:

an air supply section for feeding air to a cathode of the fuel cell, the air supply section including a compressor for compressing and conveying air, and an air passage connecting the compressor and the cathode of the fuel cell; and a hydrogen supply section for feeding hydrogen to an anode of the fuel cell, the hydrogen supply section including a hydrogen passage connecting a hydrogen supply source and the anode of the fuel cell;

wherein the air passage includes a main passage and a bypass passage, the main passage being provided with an intercooler for cooling air flowing from the compressor to the fuel cell and the bypass passage bypassing the intercooler; and wherein a heat exchanger is arranged between the air passage and the hydrogen passage so as to transfer the heat of air to hydrogen.

In this warm-up apparatus, the air passage includes the main passage, in which an intercooler is provided for cooling air flowing from the compressor to the cathode of the fuel cell, and the bypass passage bypassing the intercooler. Upon feeding supply gas from the compressor to the fuel cell, supply gas is cooled at the intercooler if it flows through the main passage, and the supply gas is not cooled if it flows through the bypass passage bypassing the intercooler. Therefore, during the normal driving which requires cooling supply gas, supply gas is fed through the main passage. On the other hand, at the start up of the fuel cell which requires a warming-up, supply gas is fed through the bypass passage to raise the temperature thereof and a warm supply gas is fed to the fuel cell. According to this warm-up apparatus, a warm supply gas is fed to the fuel cell at the time of start up. This enables quick warming-up of the fuel cell without requiring a dedicated electric heater or hydrogen-combustion heater.

Furthermore, a heat exchanger is arranged between the air passage through which air is fed to the cathode of the fuel cell and the hydrogen passage through which hydrogen is fed to the anode of the fuel cell so that the heat of air transfers to hydrogen. Air flowing through the air passage is raised its temperature by adiabatic compression of the compressor. For this reason, the heat of air will be transferred to hydrogen via the heat exchanger so as to raise the temperature of hydrogen. Therefore, it is not necessary to provide a dedicated electric heater or hydrogen-combustion heater. By way of raising the temperature of hydrogen, not only devices in the cathode system but for devices in the anode system are warmed up, and the cathode and anode of the fuel cell are quickly warmed up, thereby completing warming-up of the whole fuel cell system quickly.

In the aforementioned warm-up apparatus, a heat quantity adjustment device may be employed for adjusting a heat quantity of air flowing to the fuel cell in such a manner that a supply of air is switched between the main passage and the bypass passage.

In this warm-up apparatus, a heat quantity adjustment device is employed for adjusting a heat quantity of air flowing to the fuel cell in such a manner that a supply of air is switched between the main passage and the bypass passage. Accordingly, air and hydrogen each having an appropriate temperature will be fed to the fuel cell.

According to a third aspect of the present invention, there is provided a warm-up apparatus for a fuel cell comprising:

an air supply section for feeding air to a cathode of the fuel cell, the air supply section including a compressor for compressing and conveying air, and an air passage connecting the compressor and the cathode of the fuel cell; and a hydrogen supply section for feeding hydrogen to an anode of the fuel cell, the hydrogen supply section including a hydrogen passage connecting a hydrogen supply source and the anode of the fuel cell;

wherein a heat exchanger is arranged between the air passage and the hydrogen passage so as to transfer the heat of air to hydrogen.

In this warm-up apparatus, a heat exchanger is arranged between the air passage through which air is fed to the cathode of the fuel cell and the hydrogen passage through which hydrogen is fed to the anode of the fuel cell so that the heat of air transfers to hydrogen. An air flowing through the air passage is raised its temperature by adiabatic compression of the compressor. For this reason, heat of the air will be transferred to hydrogen via the heat exchanger so as to raise the temperature of hydrogen. Therefore, it is not necessary to provide a dedicated electric heater or hydrogen-combustion heater. By way of raising the temperature of the hydrogen, not only devices in the cathode system but for devices in the anode system are warmed up, and the cathode and anode of the fuel cell are quickly warmed up, thereby completing warming-up of the whole fuel cell system quickly.

In the aforementioned warm-up apparatus, the air passage may include a main passage, in which an intercooler for cooling air is provided, and a bypass passage, and a heat quantity adjustment device may be employed for adjusting a heat quantity of air flowing to the fuel cell in such a manner that a supply of air is switched between the main passage and the bypass passage.

In this warm-up apparatus, the air passage includes a main passage, in which an intercooler is provided, and a bypass passage bypassing the intercooler. And a heat quantity adjustment device is employed for adjusting a heat quantity of air flowing to the fuel cell in such a manner that a supply of air is switched between the main passage and the bypass passage. Accordingly, air and hydrogen each having an appropriate temperature will be fed to the fuel cell.

In the aforementioned warm-up apparatus according to the second and the third aspect of the invention, a controller may be provided for controlling the heat quantity adjustment device in accordance with a warming-up state of the fuel cell.

In this warm-up apparatus, a controller controls the heat quantity adjustment device in accordance with a warming-up state of the fuel cell such that the heat quantity adjustment device switches the supply of air between the main passage and the bypass passage for controlling the heat quantity of air flowing to the fuel cell. Accordingly, air and hydrogen each having an appropriate temperature will be fed to the fuel cell in accordance with a warm-up state of the fuel cell. A warm-up state of the fuel cell can be determined, for example, by the temperature of exhaust air discharged from the fuel cell.

In the aforementioned warm-up apparatus according to the second and the third aspect of the invention, a controller may be provided for controlling the heat quantity adjustment device in accordance with ambient temperature.

Upon raising the temperature of air to a suitable temperature, more heat quantity is required if ambient temperature is lower. On the contrary, less heat quantity is required if ambient temperature is higher. In this warm-up apparatus, the heat quantity adjustment device is controlled in accordance with ambient temperature. To be more specific, the flow rate of air flowing through the bypass passage is increased when ambient temperature is low, and the flow rate of air flowing through the main passage is increased when ambient temperature is high. Accordingly, it is possible to feed air having an appropriate temperature.

In the aforementioned warm-up apparatus according to the second and the third aspect of the invention, a controller may be provided for controlling the heat quantity adjustment device in accordance with a generation of electricity at the fuel cell.

Since the amount of hydrogen consumption increases as a generation of electricity increases, it is preferable to increase or decrease the heat quantity of air in accordance with increment or decrement of the consumption amount of hydrogen. For this reason, in this warm-up apparatus, the heat quantity adjustment device is controlled in accordance with a generation of electricity at the fuel cell. To be more specific, since the amount of hydrogen consumption is greater if the amount of electricity generation of the fuel cell increases, in order to provide such a lot of hydrogen with heat, the heat quantity of air is increased by way of increasing the flow rate of air flowing through the bypass passage. On the contrary, since the amount of hydrogen consumption is smaller if the amount of electricity generation of the fuel cell decreases, such a small quantity of hydrogen requires less heat. Therefore, the amount of air flowing through the main passage is increased because a small quantity of heat is required for air. Accordingly, air and hydrogen each having an appropriate temperature will be fed to the fuel cell.

In the aforementioned warm-up apparatus according to the second and the third aspect of the invention, a restriction may be provided in the bypass passage so that a degree of opening of the bypass passage is adjustable.

In this warm-up apparatus, a restriction is provided in the bypass passage for adjusting a degree of opening of the bypass passage so that the diameter of the bypass passage is reduced or extended. Extending the diameter of the bypass passage enables the pressure of the compressor at the output side to be enhanced. Therefore, the temperature of air is controlled by the diameter of the bypass passage. Accordingly, it is possible to control air and hydrogen to have an appropriate temperature by adjusting the diameter of the bypass passage.

BRIEF DESCRIPTION OF THE DRAWINGS

Preferred embodiments of the present invention will be described below, by way of example only, with reference to the accompanying drawings, in which:

FIG. 18 is a sectional view of a common piping.

DESCRIPTION OF THE PREFERRED EMBODIMENT

Figure 1:
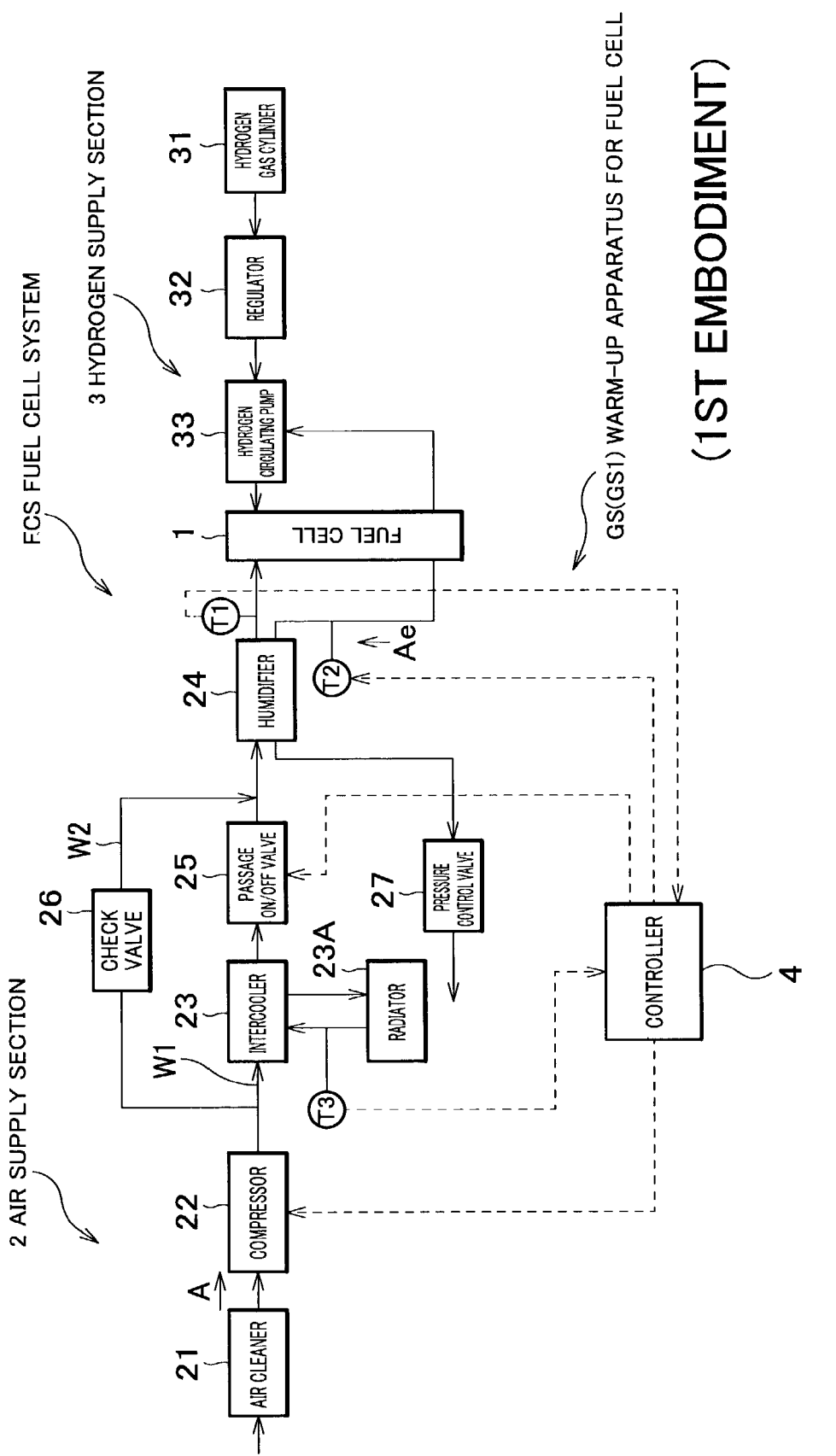
FIG. 1 is the overall arrangement of a fuel cell system including a warm-up apparatus for the fuel cell according to a first embodiment of the invention.

Referring to first and second embodiments and their modifications of the invention shown in the drawings, a warm-up apparatus for a fuel cell according to the present invention will be described.

First Embodiment

A warm-up apparatus for a fuel cell according to a fist embodiment of the invention will be described.

Figure 2:
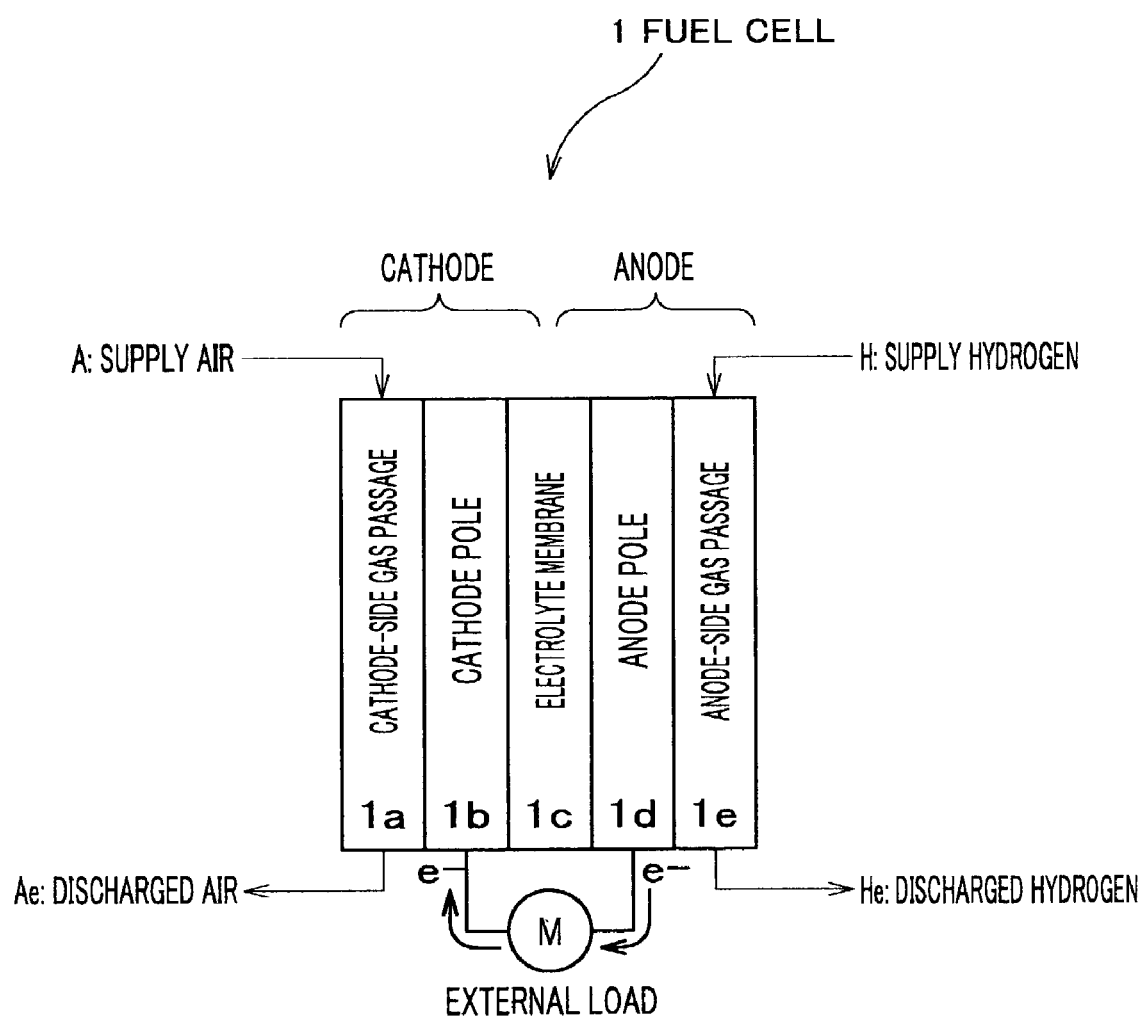
FIG. 2 is a schematic explanatory view illustrating the structure of the fuel cell shown in FIG. 1.

As referential figures relative to the fist embodiment, FIG. 1 is the overall arrangement of a fuel cell system including the warm-up apparatus for the fuel cell according to the first embodiment, and FIG. 2 is a schematic explanatory view illustrating the structure of the fuel cell shown in FIG. 1.

As shown in FIG. 1, the fuel cell system FCS comprises a fuel cell 1, an air supply section 2, a hydrogen supply section 3, a controller 4, etc. The fuel cell system FCS is an electricity generating system including a fuel cell 1 as a primary construction. The warm-up apparatus GS (GS1) for the fuel cell 1 substantially consists of the air supply section 2 and the controller 4. The fuel cell system FCS is mounted on an automobile (fuel cell-mounted electric vehicle).

As shown in FIG. 2, the fuel cell 1 is divided into the cathode (oxygen pole) and the anode (hydrogen pole) across an electrolyte membrane 1c, and each of the poles has an electrode containing a platinum series catalyst to form a cathode pole 1b and an anode pole 1d. As an electrolyte membrane 1c which can be used herein, a solid macromolecular membrane, such as perfluorocarbon sulfonic acid, which is a proton-exchange membrane, has been known. The electrolyte membrane 1c has a plurality of proton-exchanging groups in the solid macromolecule, and has a low specific resistance, when being saturated with water, lower than 20 Ω-proton at a normal temperature, thereby serving as a proton-conductive electrolyte.

Provided at the outside of the cathode pole 1b is a cathode-side gas passage 1a for feeding supply air A as oxidant gas toward the cathode pole 1b, and an anode-side gas passage 1e is provided at the outside of the anode pole 1d for feeding supply hydrogen H as fuel gas toward the anode pole 1d. The inlet and outlet of the cathode-side gas passage 1a are connected to the air supply section 2, and the inlet and outlet of the anode-side gas passage 1e are connected to the hydrogen supply section 3. Although the fuel cell 1 shown in FIG. 2 is illustrated as a single cell for the purpose of simplifying the configuration, the fuel cell 1 is actually configured as a laminate structure having approximately 200 single cells laminated. Since the fuel cell 1 generates heat by the electrochemical reaction when generating electricity, a non-shown cooling device is employed for cooling the fuel cell 1.

In the fuel cell 1, supply air A is fed through the cathode-side gas passage 1a and supply hydrogen H is fed through the anode-side gas passage 1d such that the protons produced at the anode pole 1d by the ionization of hydrogen in the presence of the catalyst are migrated in the electrolyte membrane 1c and reach the cathode pole 1b. The protons reaching to the cathode pole 1b react with the oxygen ions produced from oxygen of the supply air A, thereby producing water. The produced water and supply air A containing unused oxygen is discharged as discharged air Ae from the outlet of the cathode of the fuel cell 1. The discharged air Ae contains a lot of moisture. At the time of ionization of hydrogen, electrons $e^-$ are produced in the anode pole 1d. The produced electrons $e^-$ reach the cathode pole 1b via an external load M such as a motor.

As best seen in FIG. 1, the air supply section 2, which forms a part of the warm-up apparatus GS1, comprises an air cleaner 21, a compressor 22, an intercooler 23, a humidifier 24, a passage ON/OFF valve 25, a check valve 26, and a pressure control valve 27. Of these elements, the intercooler 23 is arranged in a main passage W1 extending between the compressor 22 and the fuel cell 1. The passage ON/OFF valve 25 is arranged in the main passage W1 at the downstream of the intercooler 23.

A bypass passage W2 extends between the compressor 22 and the fuel cell 1 in such a manner as to bypass the intercooler 23. Specifically, the bypass passage W2 branches from the main passage W1 at an intermediate between the compressor 22 and the intercooler 23, and joins the main passage W1 at an intermediate between the passage ON/OFF valve 25 and the humidifier 24. Therefore, supply gas flowing through the bypass passage W2 does not flow into the intercooler 23.

The cross-sectional area of the bypass passage W2 is smaller than that of the main passage W1, and is set, for example, ½ or less with regard to the main passage W1. Because of the smaller cross-sectional area of the bypass passage W2, pressure of supply air A at the discharge side of the compressor 22 becomes higher when flowing through the bypass passage W2 than when flowing through the main passage W1. As a result, the compression amount of the compressor 22 increases, leading to increasing temperature of supply air A.

The air supply section 2 is provided with temperature sensors T1, T2, and T3 for detecting temperatures of supply air, discharged air, cooling water, etc.

The air cleaner 21 consists of a non-shown filter and the like. The air cleaner 21 filters air (supply air) to be fed to the cathode of the fuel cell 1 to remove impurities or contaminants contained in the supply air A.

The compressor 22 mainly consists of a supercharger (not shown) and a motor (not shown) for driving the supercharger. The compressor 22 applies adiabatic compression to supply air A that is used in the fuel cell as oxidant gas, and feeds the compressed air under pressure toward the fuel cell 1. During adiabatic compression, supply air A is heated. The heated supply air A contributes to warming-up of the fuel cell 1.

The intercooler 23 is furnished with a cooling water channel, through which cooling water flows. During the normal driving of the fuel cell 1, the intercooler 23 cools supply air from the compressor 22 by heat exchange between cooling water and supply air. The temperature of supply air that is fed from the compressor 22 during the normal driving of the fuel cell 1 is usually about 120° C. However, the fuel cell 1 is driven in the temperature range of about 80 to 90° C. For this reason, supply air A is cooled down to a temperature of about 60 to 75° C., and then introduced into the fuel cell 1.

The humidifier 24 is a fuel cell discharged gas supplying type, and substantially consists of a housing and a bundle of hollow fiber membranes made by a number of, for example, 5000 hollow fiber membranes bound together and accommodated in the housing. Supply air A flows within the hollow fiber membranes, and discharged air Ae flows outside the hollow fiber membranes within the housing. Since water is produced in the fuel cell 1 upon generation of electricity and discharged air Ae contains a lot of water or moisture, supply air A is humidified by moisture exchanging with the water. As the humidifier 24, any known device may be used other than this fuel cell discharged gas supplying type. For example, one known humidifier (a kind of carburetor) comprises a venturi, a water tank, a siphon tube connecting the venturi and the water tank, etc, and supply air A is humidified by water, which is stored in the water tank for the purpose of humidifying air A and is drawn by Venturi effect for spraying the same.

The passage ON/OFF valve 25 positions in the main passage W1 so that supply air A flows into the main passage W1 if the passage ON/OFF valve 25 is ON and supply air A flows into the bypass passage W2 if the passage ON/OFF valve 25 is OFF.

The check valve 26 positions in the bypass passage W2 to prevent a counterflow of supply air A.

The pressure control valve 27 consists of a butterfly valve (not shown), a stepping motor (not shown) for driving the butterfly valve, etc. The pressure control valve 27 controls pressure (discharge pressure) of discharged air Ae that is discharged from the fuel cell 1 by decreasing or increasing the opening degree of the pressure control valve 27. Decreasing the opening degree of the pressure control valve 27 allows the fuel cell 1 to increase its discharge pressure, and therefore, the temperature rising range of discharged air Ae increases proportionally to the increasing discharge pressure. Meanwhile, increasing the opening degree of the pressure control valve 27 allows the fuel cell 1 to decrease its discharge pressure, and therefore, the temperature rising range of discharged air Ae decreases proportionally to the decreasing discharge pressure.

The temperature sensor T1 comprises a thermistor and the like. The temperature sensor T1 detects temperature of supply air A at the inlet of the cathode of the fuel cell 1, and transmits a detection signal to the controller 4.

Likewise the temperature sensor T1, the temperature sensor T2 comprises a thermistor and the like. The temperature sensor T2 detects temperature of discharged air Ae at the outlet of the cathode of the fuel cell 1, and transmits a detection signal to the controller 4.

Likewise the temperature sensors T1, T2, the temperature sensor T3 comprises a thermistor and the like. The temperature sensor T3 detects water temperature of cooling water within the intercooler 23, and transmits a detection signal to the controller 4.

As best seen in FIG. 1, the hydrogen supply section 3 comprises a hydrogen gas cylinder 31, a regulator 32, a hydrogen circulating pump 33, etc.

The hydrogen gas cylinder 31 consists of a non-shown high-pressure hydrogen bomb, and stores supply hydrogen H to be introduced to the anode of the fuel cell 1. Stored supply hydrogen H is pure hydrogen, and the pressure thereof ranges from 15 to 20 MpaG (150–200 kg/cm$^2$G). The hydrogen gas cylinder 31 may be made from hydrogen absorbing alloys, and may store hydrogen at a pressure of about 1 MPaG (10 kg/cm$^2$G).

The regulator 32 comprises a diaphragm (not shown), a pressure regulating spring (not shown) and the like. The regulator 32 is a pressure control valve for decreasing pressure of supply hydrogen H that is stored at a high pressure to a predetermined pressure so as to enable the use of supply hydrogen H under a certain constant pressure.

The hydrogen circulating pump 33 comprises a non-shown ejector and the like. The hydrogen circulating pump 33 utilizes a flow of supply hydrogen H flowing toward the anode of the fuel cell 1 so as to absorb spent supply hydrogen H after the use in the fuel cell 1 as fuel gas, viz. discharged hydrogen He discharged from the anode of the fuel cell 1, and circulates the spent supply hydrogen H. The reason for circulating and utilizing discharged hydrogen is that supply hydrogen H stored in the hydrogen gas cylinder 3 is pure hydrogen 1.

The controller 4, which forms apart of the warm-up apparatus GS1, although not shown, comprises a CPU, a memory, an input/output interface, an A/D converter, a bus, etc. The controller 4 entirely and systematically controls the fuel cell system FCS as well as controls temperature of supply air A to be fed to the fuel cell 1. As mentioned above, the controller 4 receives detection signals from the temperature sensors T1, T2, and T3. The controller 4 also transmits control signals with respect to the compressor 22, the passage ON/OFF valve 25, the check valve 26, and the pressure control valve 27.

Figure 3:
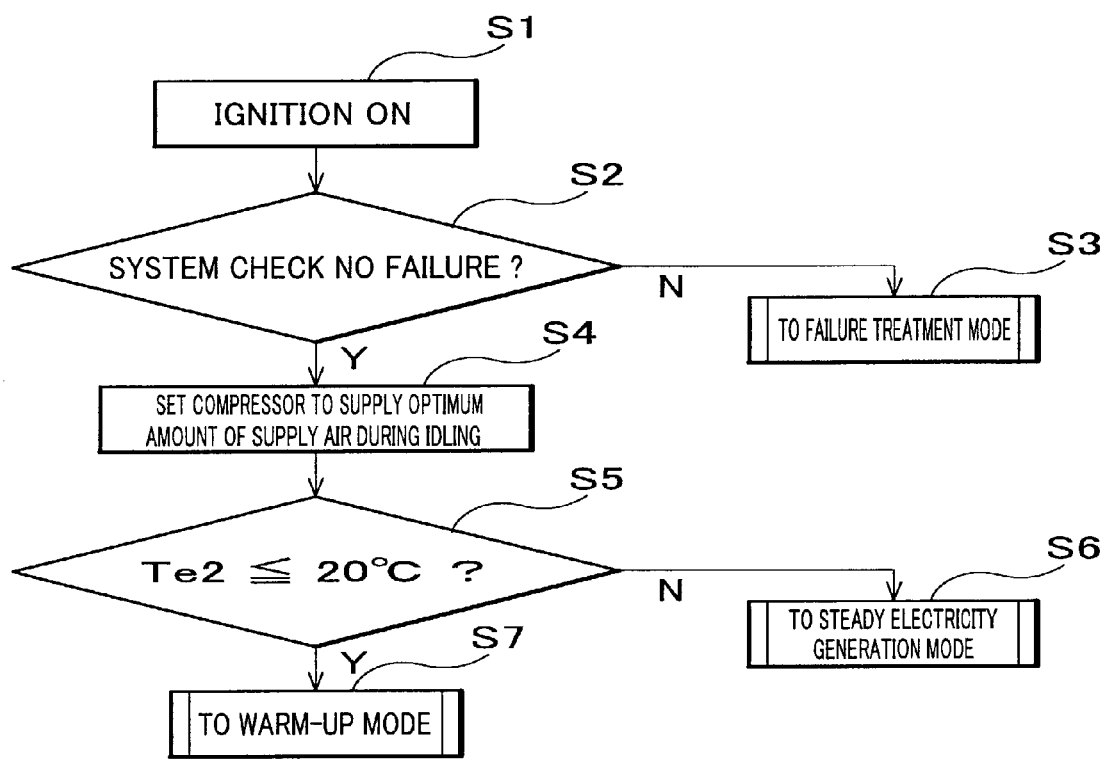
FIG. 3 is a flow chart showing a series of control flows of the warm-up apparatus according to the first embodiment from a start up to a warm-up mode.
Figure 4:
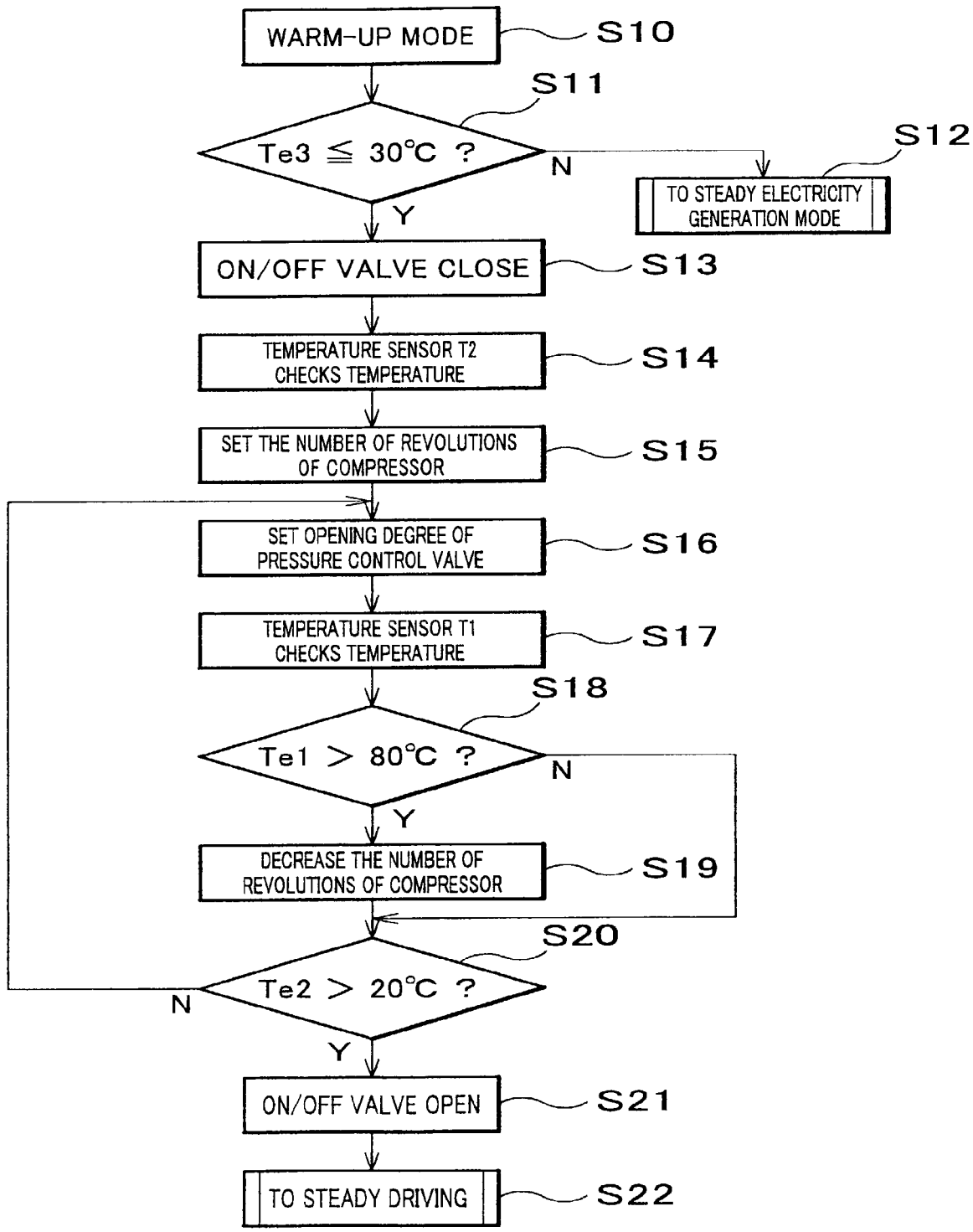
FIG. 4 is a flow chart showing a series of control flows of the warm-up apparatus according to the first embodiment from the warm-up mode to a steady driving mode.

With reference to FIGS. 3 and 4, one operation example at star up of the warm-up apparatus GS1 according to the first embodiment will be described (see also FIG. 1 when necessary).

Herein, FIGS. 3 and 4 are flow charts showing a series of control flows of the warm-up apparatus according to the first embodiment. In the flow shown in FIG. 4, heating amount of supply air A is controlled with the number of revolutions of the compressor 22. The target temperature of supply air A to be fed to the fuel cell 1 is in the range of between 65° C. and 80° C.

In FIG. 3, when the ignition switch of the fuel cell-mounted electric vehicle is ON (S1) for starting the electric vehicle, a predetermined system check is carried out to determine whether a failure is detected for each device (S2). If a failure is detected in step S2, the operation proceeds to a predetermined failure treatment mode (S3) associating with each failure state. Meanwhile, if no failure is detected in step S2, the number of revolutions of the compressor 22 is set (S4) such that the optimum amount of supply air A is fed during idling. Subsequently, the temperature of discharged air Ae at the output of the fuel cell 1 is detected with the temperature sensor T2, and a detection is made as to whether the temperature Te2 of discharged air Ae is equal to or lower than 20° C. (S5). Since the temperature Te2 of discharged air Ae is detected just after the air is discharged from the fuel cell 1, a warm-up state of the fuel cell 1 is determined depending on the temperature of discharged air Ae.

As the result, if the temperature Te2 of discharged air Ae is higher than 20° C., it is determined that the warm-up has been completed, and the operation proceeds to a steady electricity generation mode (S6). If the temperature Te2 of discharged air Ae is equal to or lower than 20° C., it is determined that the fuel cell 1 has not been ready yet and requires a warm-up. The operation then proceeds to a warm-up mode (S7).

With reference to FIG. 4, control after proceeding to the warm-up mode will be described. When the operation proceeds to the warm-up mode (S10), the water temperature of cooling water at the intercooler 23 is detected with the temperature sensor T3, and a detection is made as to whether the water temperature Te3 of the cooling water is equal to or lower than 30° C. (S11). Herein, if the water temperature Te3 of the cooling water is higher than 30° C., it is determined that the fuel cell 1 has been warmed up, and then the operation proceeds to the steady electricity generation mode (S12). Meanwhile, if the water temperature Te3 of the cooling water is equal to or lower than 30° C., it is determined that the fuel cell has not been ready yet and requires a warm-up. Therefore, supply air A from the compressor 22 is fed into the bypass passage W2 by closing the passage ON/OFF valve 25 (S13). Since the bypass passage W2 bypasses the intercooler 23, supply air A flowing through the bypass passage W2 is not cooled by the intercooler 23. Furthermore, the cross-sectional area of the bypass passage W2 is smaller than that of the main passage W1, and is set, for example, about ½ with regard to the main passage W1. For this reason, when supply air A flows into the bypass passage W2, pressure of the outlet of the compressor 22 becomes greater than when supply air A flows into the main passage W1. As the result, compression amount of the compressor 22 increases, allowing temperature of supply air A to rise further. Accordingly, a warm-up state of the fuel cell 1 is determined on the basis of the water temperature of cooling water at the compressor 22 so as to feed supply air A either to the main passage W1 or to the bypass passage W2 depending on the warm-up state of the fuel cell 1.

Supply air A, the temperature of which has risen after flowing through the bypass passage W2, is fed to the fuel cell 1 via the humidifier 24. Since high-temperature supply air A is fed to the fuel cell 1, it is possible to complete a warm-up quickly.

Figure 5A:
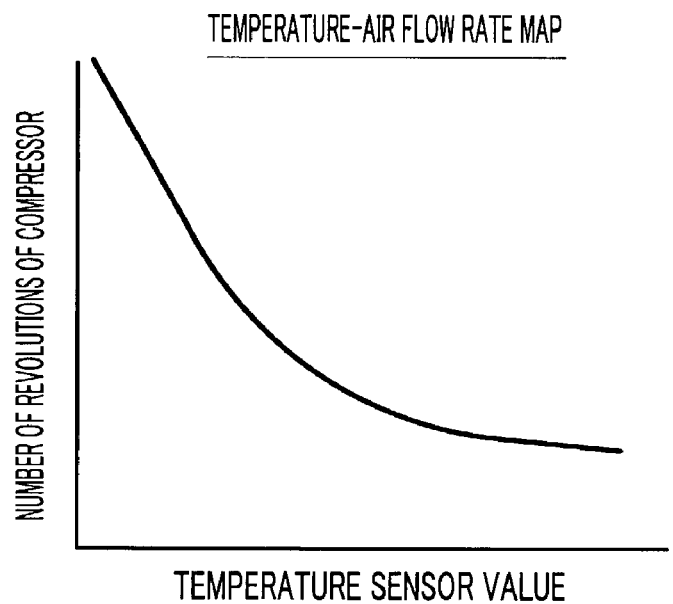
FIG. 5A is a map of temperature and airflow rate showing the relations between the number of revolutions of a compressor and temperature of supply air.
Figure 5B:
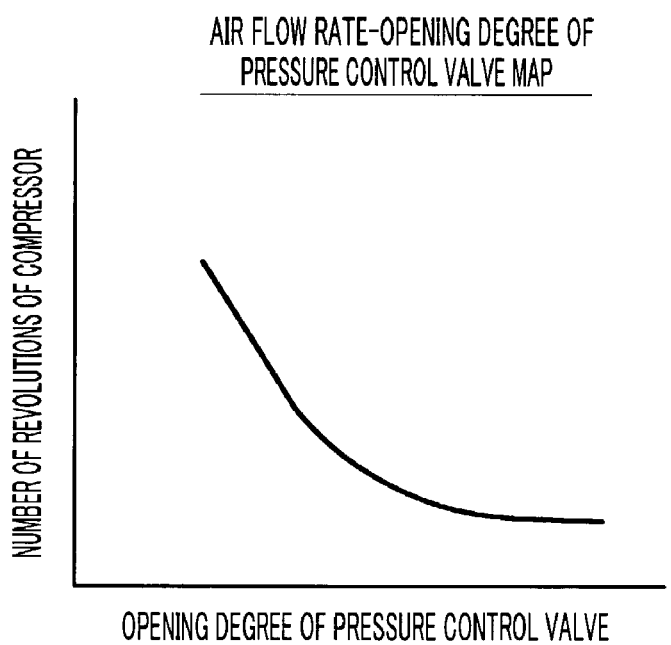
FIG. 5B is a map of airflow rate and opening degree of a pressure control valve showing the number of revolutions of the compressor and opening degree of the pressure control valve.

After the passage ON/OFF valve 25 is closed, the temperature sensor T2 checks the temperature of discharged air Ae at the output of the fuel cell 1 (S14). When the temperature of discharged air Ae is detected at the output of the fuel cell 1, the number of revolutions of the compressor 22 is detected from the map of temperature and air flow rate shown in FIG. 5A on the basis of the corresponding temperature of the discharged air Ae. The number of revolutions of the compressor 22 is set to the detected value (S15). Subsequently, the opening degree of the pressure control valve 27 that is positioned at the output of the fuel cell 1 is set (S16). In this instance, with reference to the map of air flow rate and opening degree of the pressure control valve shown in FIG. 5B, the opening degree of the pressure control valve 27 is set on the basis of the number of revolutions of the compressor 22 such that the pressure of supply air A at the input of the fuel cell 1 is set to a predetermined value.

After the opening degree of the pressure control valve 27 is set, the temperature sensor T1 checks the temperature Te1 of supply air A at the input of the fuel cell 1 (S17). When the temperature Te1 of supply air A is detected at the input of the fuel cell 1, a detection is made as to whether the temperature Te1 is higher than 80° C. (S18). The temperature Te1 over 80° C. is sufficient for warming up the fuel cell 1. Therefore, if the temperature Te1 is higher than 80° C., the number of revolutions of the compressor 22, and hence the compression amount of supply air A, is decreased so as to decrease the temperature of supply air A flowing to the fuel cell 1 (S19). Meanwhile, if the temperature Te1 is equal to or lower than 80° C., the compressor 22 goes on to drive without varying the number of revolutions of the compressor 22. Subsequently, the temperature Te2 of discharged air Ae is detected at the output of the fuel cell 1 to determine whether the temperature Te2 is higher than 20° C. (S20). As the result, if the temperature Te2 is equal to or lower than 20° C., it is determined that the fuel cell 1 further requires a warm-up, and the operation returns to step S16 to control continuously the warm-up of the fuel cell 1. Meanwhile, if the temperature Te2 is higher than 20° C., the passage ON/OFF valve 25 opens (S21). Supply air A from the compressor 22 is then fed to the main passage W1. Supply air A is fed through the main passage W1 to the fuel cell 1, thereby completing the warm-up mode and shifting to the steady driving (S22).

As mentioned above, since supply air A is fed to the fuel cell 1 through the bypass passage W2 during a warm-up of the fuel cell 1, warm supply air A bypassing the intercooler 23 is fed to the fuel cell 1. Furthermore, since the fuel cell 1 is warmed up quickly, there is no need to provide a dedicated electric heater or hydrogen-combustion heater for warming up the fuel cell 1 at the start up. Furthermore, since supply air A flows into the intercooler 23 after completing the warm-up of the fuel cell 1 and during the normal mode, it is possible to control supply air A flowing to the fuel cell 1 such that the temperature thereof would not rise too much.

In the first embodiment, the warm-up state is determined on the basis of the temperature Te2 of discharged air Ae that is discharged from the fuel cell 1 and the water temperature Te3 of cooling water at the intercooler 23. However, the warm-up state of the fuel cell 1 may be determined on the basis of either one of the temperatures Te2 and Te3. In this instance, of course the temperature sensor which is not used for determining the warm-up state of the fuel cell 1 may be omitted.

First Modification

A first modification of the warm-up apparatus for the fuel cell will be described. Parts or elements similar to those previously described regarding the first embodiment will be denoted by the same reference numerals and the description thereof will be omitted.

Figure 6:
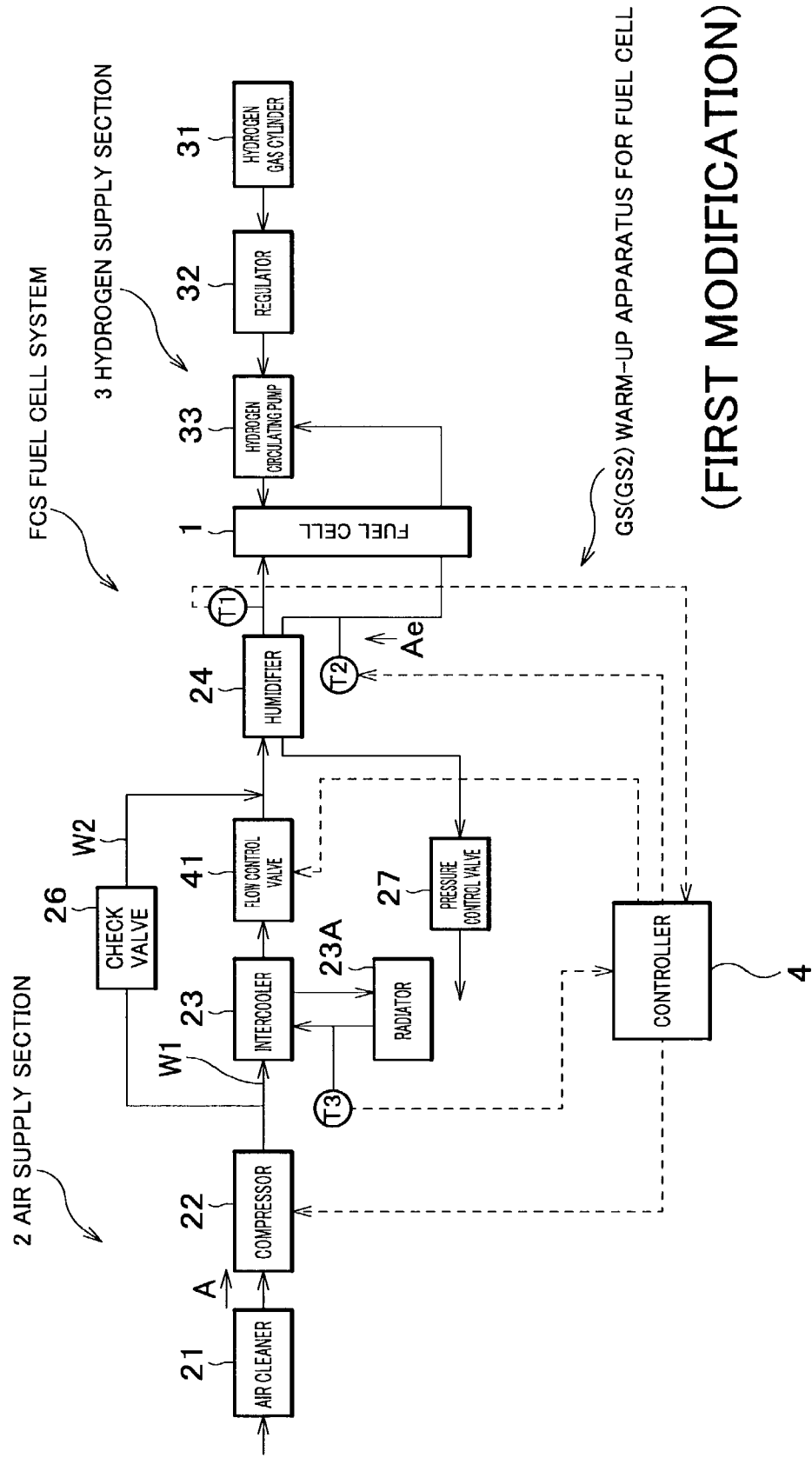
FIG. 6 is the overall arrangement of a fuel cell system including a warm-up apparatus for the fuel cell according to a first modification.

Herein, FIG. 6 is the overall arrangement of a fuel cell system including a warm-up apparatus for the fuel cell according to the first modification.

As shown in FIG. 6, the warm-up apparatus GS2 according to the first modification has substantially the same configuration as the warm-up apparatus GS1 according to the first embodiment. However, the warm-up apparatus GS2 includes a flow control valve 41 in place of the passage ON/OFF valve 25 shown in FIG. 1. With such a configuration of the warm-up apparatus GS2, it is possible to carry out a warm-up of the fuel cell 1 not only at start up but also during a low load operation other than start up.

Figure 7:
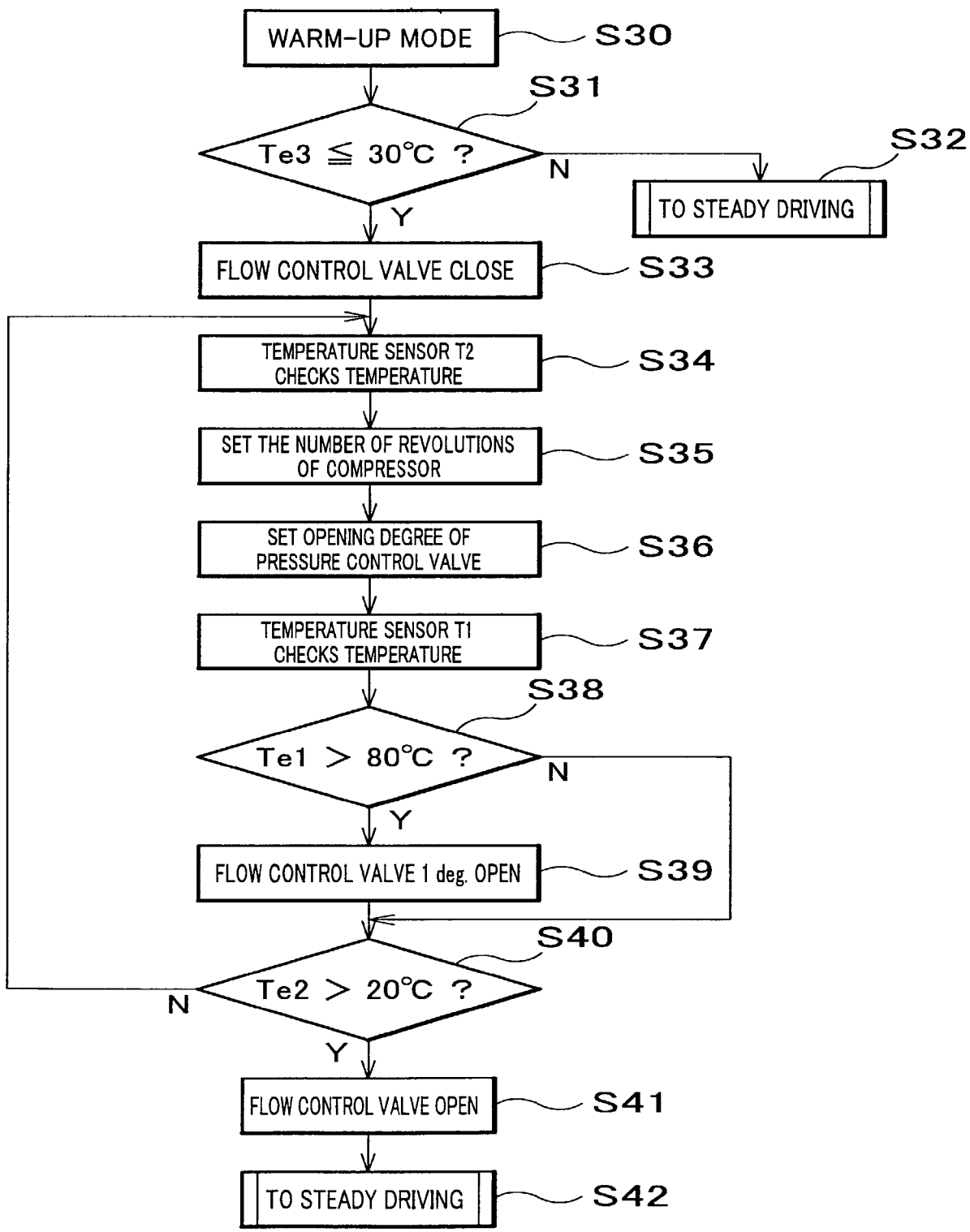
FIG. 7 is a flow chart showing a series of control flows of the warm-up apparatus according to the first modification from the warm-up mode to the steady driving mode.

With reference to FIG. 7, one operation example of the warm-up apparatus GS2 during the drive of the fuel cell 1 will be described (see also FIG. 6 when necessary).

Herein, FIG. 7 is a flow chart showing a series of control flows of the warm-up apparatus according to the first modification from the warm-up mode to the steady driving mode. In the flow shown in FIG. 7, heating amount of supply air A is controlled with the opening degree of the flow control valve 41.

In FIG. 7, when the operation of the fuel cell 1 proceeds to the warm-up mode (S30), the water temperature Te3 of cooling water at the intercooler 23 is detected with the temperature sensor T3, and a detection is made as to whether the water temperature Te3 is equal to or lower than 30° C. (S31). Herein, if the water temperature Te3 is higher than 30° C., it is determined that the fuel cell does not require a warm-up, and then the operation proceeds to the steady driving (S32). Meanwhile, if the water temperature Te3 is equal to or lower than 30° C., it is determined that the fuel cell is still cold and requires a warm-up. In this event, the flow control valve 41 is closed (S33) such that supply air A from the compressor 22 flows through the bypass passage W2. Subsequently, the temperature sensor T2 checks the temperature Te2 of discharged air Ae at the output of the fuel cell 1 (S34). When the temperature Te2 is detected, the number of revolutions of the compressor 22 is set to a predetermined value (S35). The number of revolutions of the compressor 22 is set, for example, to 3000 rpm. After setting the number of revolutions of the compressor 22, with reference to the map of air flow rate and opening degree of the pressure control valve shown in FIG. 5B, the opening degree of the pressure control valve 27 is set (S36) on the basis of the number of revolutions of the compressor 22.

After adjusting the opening degree of the pressure control valve 27, the temperature sensor T1 checks the temperature Te1 of supply air A at the input of the fuel cell 1 (S37). When the temperature Te1 of supply air A is detected with the temperature sensor T1, a detection is made as to whether the temperature Te1 is higher than 80° C. (S38). The temperature Te1 over 80° C. is sufficient for warming up the fuel cell 1. Therefore, if the temperature Te1 is higher than 80° C., the flow control valve 41 opens slightly, for example, by 1 deg (S39) such that a part of supply air A flowing through the bypass passage W2 is fed through the main passage W1. Supply air A flowing through the main passage W1 is cooled at the intercooler 23. Furthermore, since the cross-sectional area of the main passage W1 is wide, the compression amount of supply air A at the compressor 22 is decreased. Therefore, the temperature of supply air A flowing to the fuel cell 1 decreases slightly. Meanwhile, if the detected temperature Te1 in step S37 is equal to or lower than 80° C., it is determined that the temperature of supply air A is not too high, and supply air A is fed to the fuel cell 1 without varying the opening degree of the flow control valve 41.

Subsequently, the temperature Te2 of discharged air Ae that is discharged from the fuel cell 1 is detected with the temperature sensor T2, and a determination is made as to whether the temperature Te2 is higher than 20° C. (S40). As the result, if the temperature Te2 is equal to or lower than 20° C., the operation returns to step S34 to control repeatedly the warm-up of the fuel cell 1. During control of the warm-up, since the flow control valve 41 gradually and slightly increases its opening degree by 1 degree each, it is possible to control the temperature of supply air A within a desired temperature range. Furthermore, since supply air A is fed to the fuel cell 1 through the main passage W1 and bypass passage W2, flow rate of supply air A does not decrease.

Furthermore, if the detected temperature Te2 of discharged air A is higher than 20° C. in step S40, it is determined that the fuel cell 1 has been warmed up, and the flow control valve 41 opens (S41) such that supply air A from the compressor 22 flows through the main passage W1. Therefore, the operation shifts to the steady driving and the warm-up is completed (S42).

Accordingly, in the first modification, since the opening degree of the flow control valve 41 is adjusted in accordance with a warm-up state of the fuel cell 1, supply air A is controlled to a desired temperature at which the fuel cell 1 generates electricity effectively. Therefore, even during the drive of the fuel cell 1, supply air A having a desired temperature will be fed to the fuel cell 1 without decreasing supply amount of supply air A.

Second Modification

A warm-up apparatus according to a second modification will be described. Parts or elements similar to those previously described regarding the first embodiment will be denoted by the same reference numerals and the description thereof will be omitted.

Figure 8:
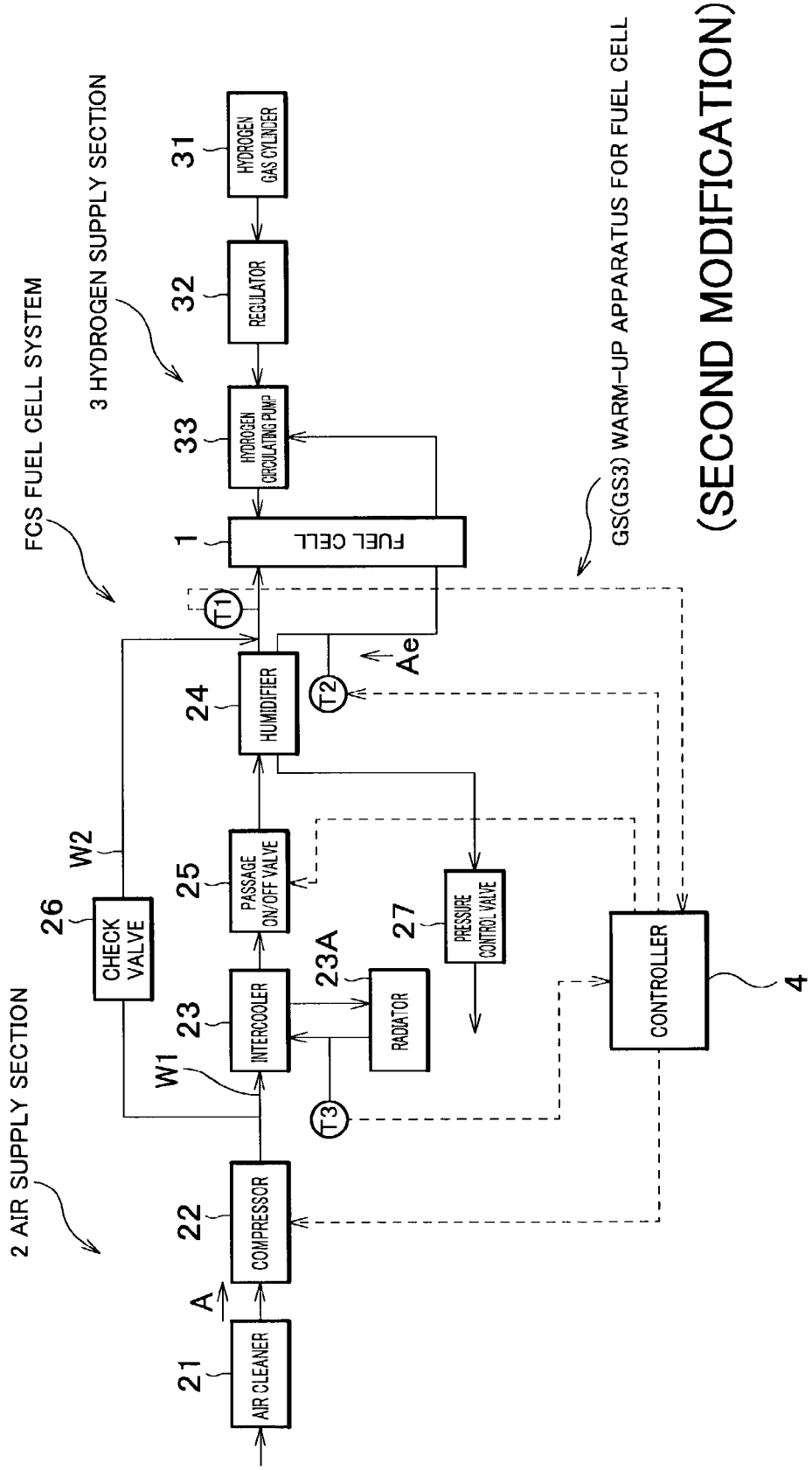
FIG. 8 is the overall arrangement of a fuel cell system including a warm-up apparatus for the fuel cell according to a second modification.

Herein, FIG. 8 is the overall arrangement of a fuel cell system including a warm-up apparatus for the fuel cell according to the second modification.

The warm-up apparatus GS3 according to the second modification has substantially the same configuration as the warm-up apparatus GS1 according to the first embodiment. However, when comparing with the warm-up apparatus GS1 according to the first embodiment, arrangement of the bypass passage W2 differs. Specifically, in the first embodiment shown in FIG. 1, one end of the bypass passage W2 is connected between the passage ON/OFF valve 25 and the humidifier 24. However, in the second modification, one end of the bypass passage W2 is connected between the humidifier 24 and the fuel cell 1.

According to the second modification, supply air A flows into the fuel cell via the bypass passage W2 without passing through the intercooler 23 and the humidifier 24. When supply air A passes through the humidifier 24, supply air A is humidified, and at the same time, temperature of supply air A decreases slightly. In the second modification, supply air A flowing through the bypass passage W2 does not pass through the humidifier 24. As described before in the first embodiment, supply air A flows through the bypass passage W2 when the fuel cell 1 requires a warm-up. Therefore, in the warm-up apparatus GS3 according to the second modification, since supply air A flowing through the bypass passage W2 does not pass through the humidifier 24 during the warm-up of the fuel cell 1, it is possible to complete a warm-up of the fuel cell 1 much more quickly.

Third Modification

A warm-up apparatus according to a third modification will be described. Parts or elements similar to those previously described regarding the first embodiment will be denoted by the same reference numerals and the description thereof will be omitted.

Figure 9:
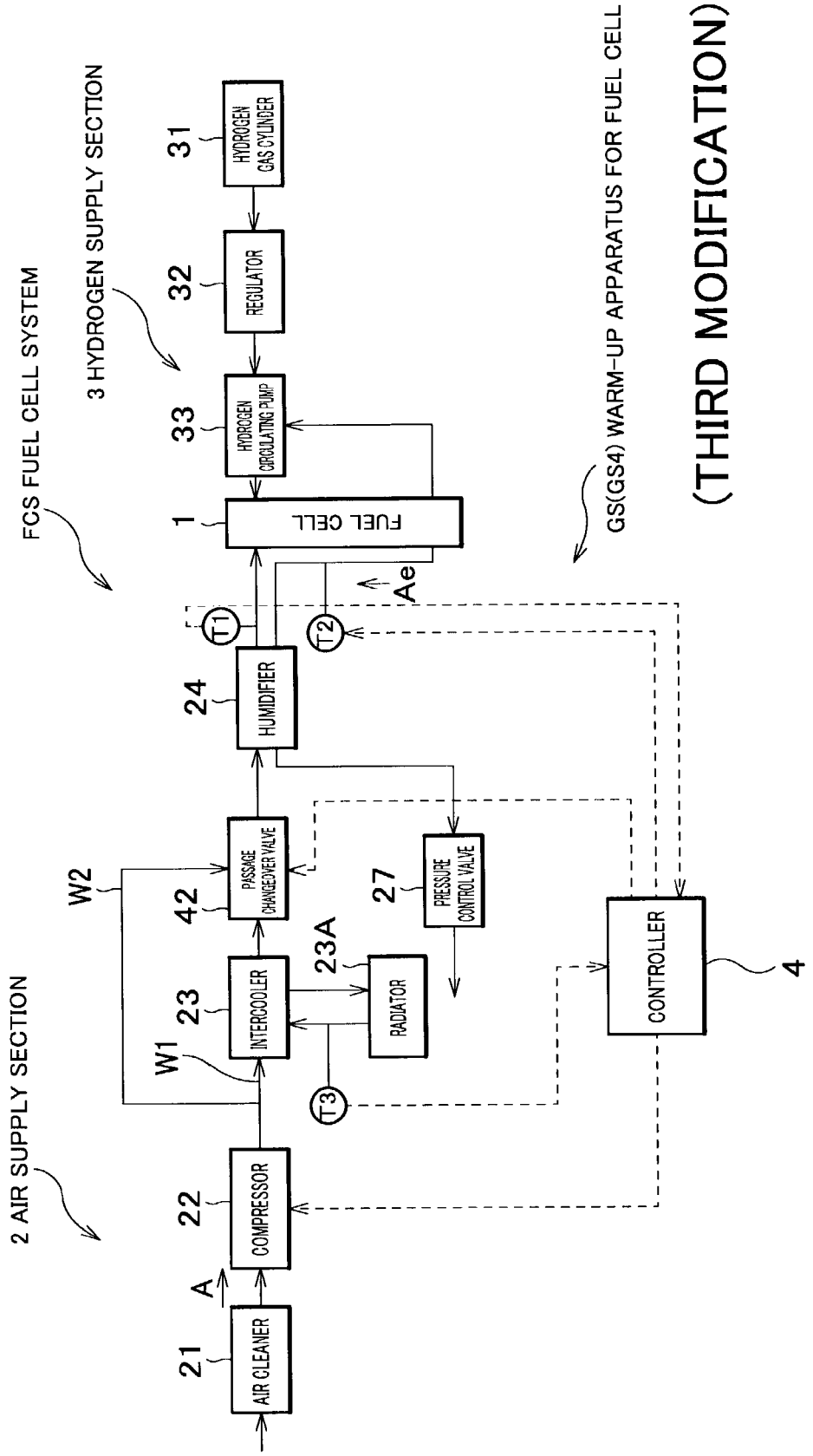
FIG. 9 is the overall arrangement of a fuel cell system including a warm-up apparatus for the fuel cell according to a third modification.

Herein, FIG. 9 is the overall arrangement of a fuel cell system including a warm-up apparatus for the fuel cell according to the third modification.

The warm-up apparatus GS4 according to the third modification has substantially the same configuration as the warm-up apparatus GS1 according to the first embodiment. However, according to the warm-up apparatus GS4, as shown in FIG. 9, a passage changeover valve 42 is employed in place of the passage ON/OFF valve 25 and the check valve 26 of the first embodiment shown in FIG. 1. With providing the passage changeover valve 42, it is possible to decrease the number of required parts when compared with the warm-up apparatus GS1 according to the first embodiment.

Fourth Modification

A warm-up apparatus according to a fourth modification will be described. Since the configuration of the warm-up apparatus is substantially the same as the second modification, parts or elements similar to those previously described regarding the second modification will be denoted by the same reference numerals and the description thereof will be omitted.

Figure 10:
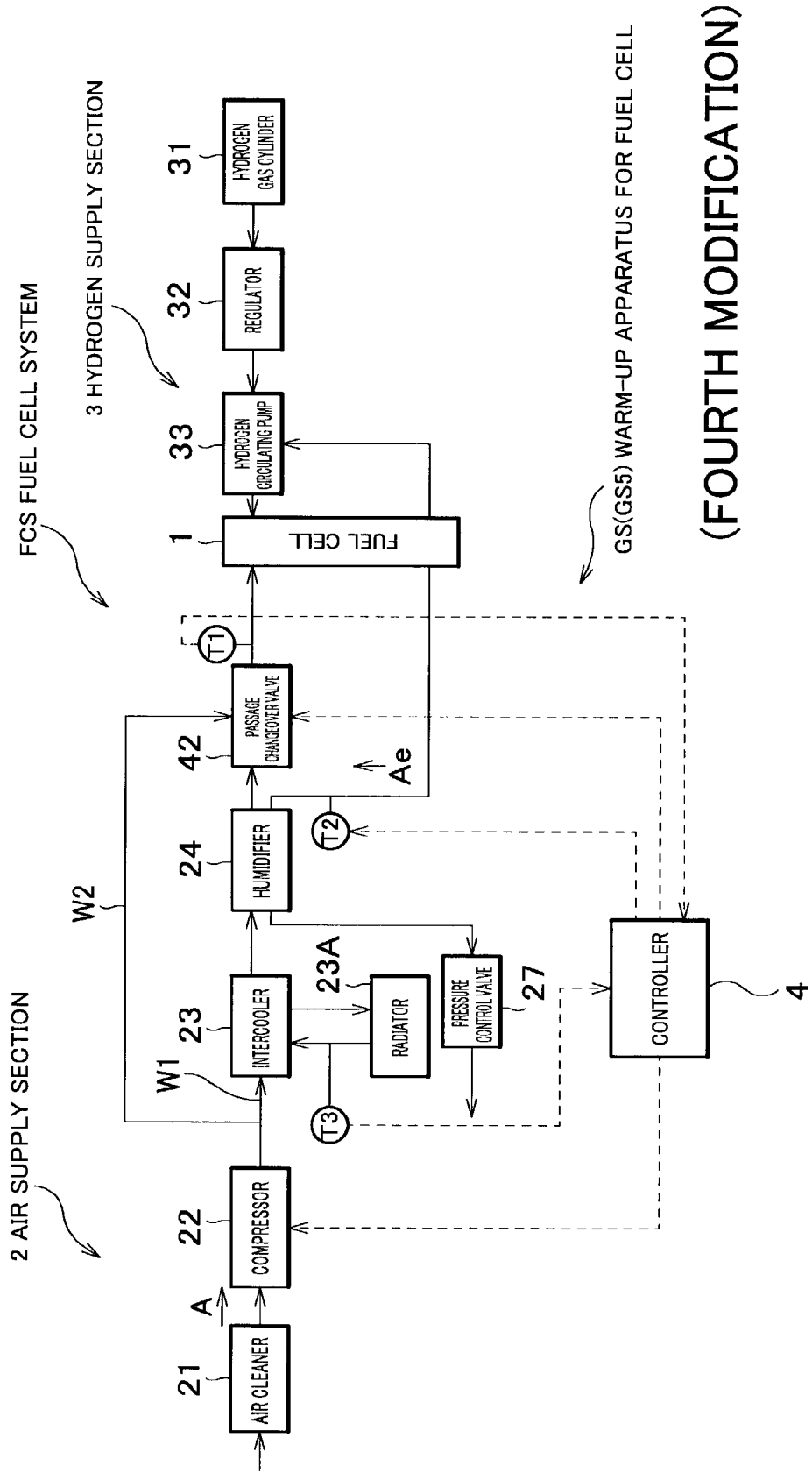
FIG. 10 is the overall arrangement of a fuel cell system including a warm-up apparatus for the fuel cell according to a fourth modification.

Herein, FIG. 10 is the overall arrangement of a fuel cell system including a warm-up apparatus for the fuel cell according to the fourth modification.

The warm-up apparatus GS according to the fourth modification has substantially the same configuration as the warm-up apparatus GS3 according to the second modification. However, according to the warm-up apparatus GS5, as shown in FIG. 10, a passage change over valve 42 is employed in place of the passage ON/OFF valve 25 and the check valve 26 of the second modification shown in FIG. 8. With providing the passage changeover valve 42, it is possible to decrease the number of required parts when compared with the warm-up apparatus GS3 according to the second modification.

While the invention has been described in detail and with reference to the first embodiment and modifications thereof, it will be apparent to one skilled in the art that various changes and modifications can be made therein without departing from the spirit and scope thereof.

For example, the hydrogen supply section is constructed such that hydrogen is fed from the hydrogen tank to the fuel cell. However, raw fuel liquid such as methanol may be used. In this instance, raw fuel liquid is reformed by a reformer to produce hydrogen-enriched fuel gas and then supplied to the fuel cell. Furthermore, the warm-up apparatus of the present invention may be adapted to the hydrogen supply section regardless of whether or not discharged hydrogen is circulated. The humidifier may be any known type utilizing either a two fluid nozzle or supersonic wave. Further, the compressor may be a reciprocating type, instead of a turbine rotation type such as a supercharger or turbocharger. Furthermore, as a configuration where a pressure control valve is provided between a compressor and a heat exchanger, it is possible to utilize heat generated by adiabatic compression of the compressor.

Furthermore, since high-temperature supply air is fed to the fuel cell, a warm-up of the fuel cell is carried out while the fuel cell is generating electricity. Therefore, electricity is taken out from the fuel cell shortly after the start up, preventing waste of hydrogen.

Second Embodiment

A warm-up apparatus for a fuel cell according to a second embodiment of the invention will be described.

Figure 11:
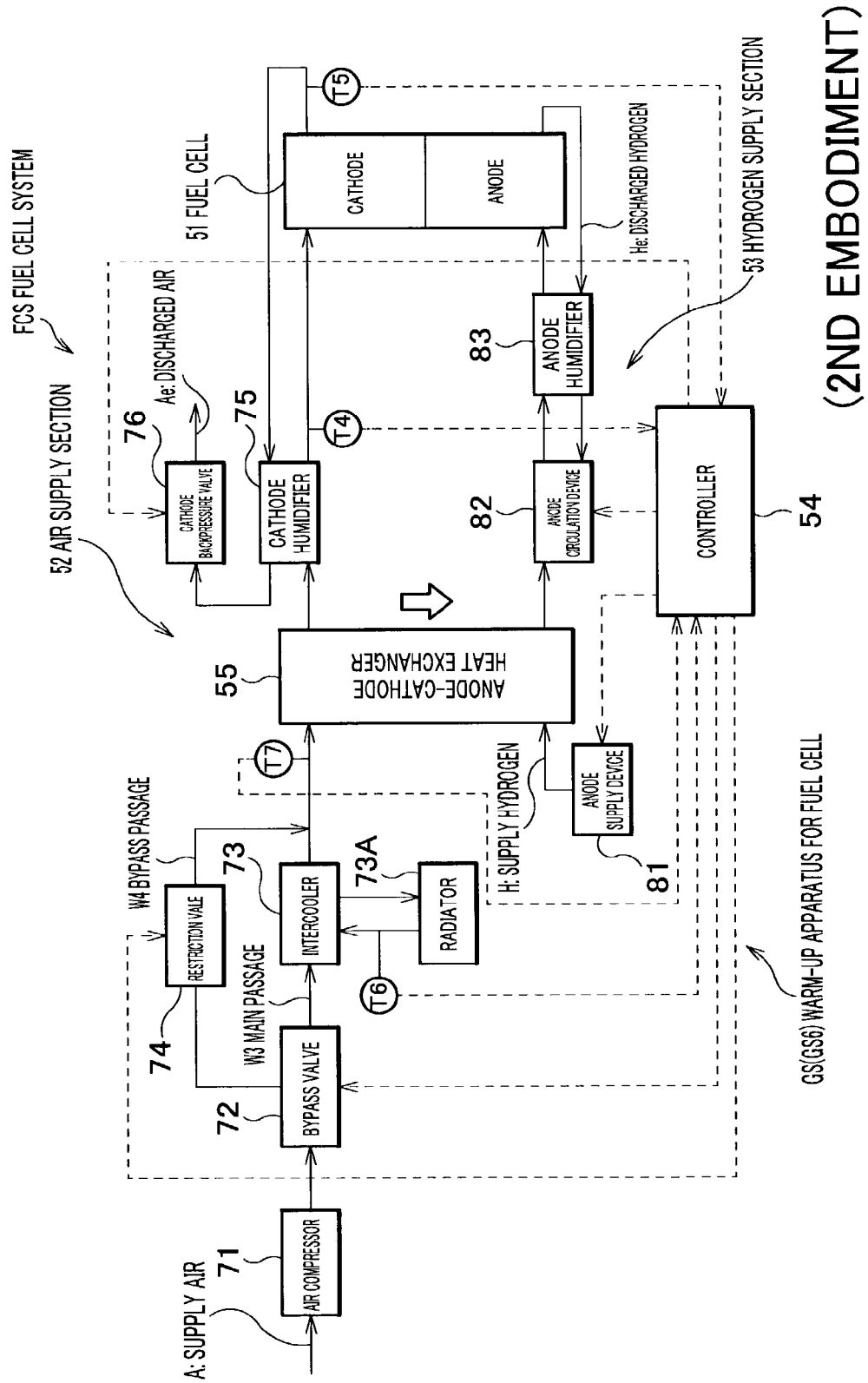
FIG. 11 is the overall arrangement of a fuel cell system including a warm-up apparatus for the fuel cell according to a second embodiment of the present invention.
Figure 12:
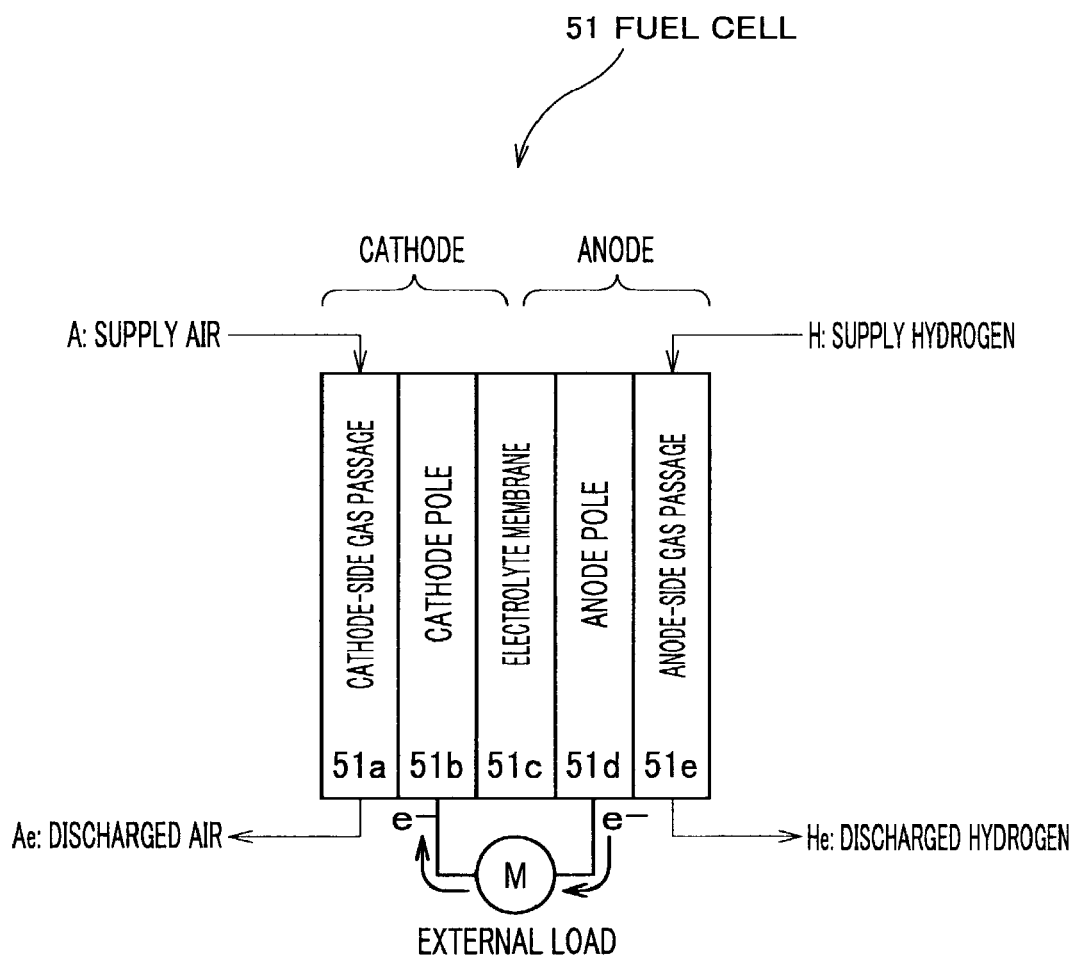
FIG. 12 is a schematic explanatory view illustrating the structure of the fuel cell shown in FIG. 11.

As referential figures relative to the second embodiment, FIG. 11 is the overall arrangement of a fuel cell system including the warm-up apparatus for the fuel cell according to the second embodiment, and FIG. 12 is a schematic explanatory view illustrating the structure of the fuel cell shown in FIG. 11;

As shown in FIG. 11, the fuel cell system FCS comprises a fuel cell 51, an air supply section 52, a hydrogen supply section 53, a controller 54, an anode-cathode heat exchanger (hereinafter referred to as a heat exchanger) 55, etc. The fuel cell system FCS is an electricity generating system including a fuel cell 51 as a primary construction. The warm-up apparatus GS (GS6) for the fuel cell 1 substantially consists of the air supply section 52 and the controller 54. The fuel cell system FCS is mounted on an automobile (fuel cell-mounted electric vehicle).

As shown in FIG. 12, the fuel cell 51 is divided into the cathode (oxygen pole) and the anode (hydrogen pole) across an electrolyte membrane 51c, and each of the poles has an electrode containing a platinum series catalyst to form a cathode pole 51b and an anode pole 51d. As an electrolyte membrane 51c which can be used herein, a solid macromolecular membrane, such as perfluorocarbon sulfonic acid, which is a proton-exchange membrane, has been known. The electrolyte membrane 51c has a plurality of proton-exchanging groups in the solid macromolecule, and has a low specific resistance, when being saturated with water, lower than 20 $\Omega$-proton at a normal temperature, thereby serving as a proton-conductive electrolyte.

Provided at the outside of the cathode pole 51b is a cathode-side gas passage 51a for feeding supply air A as oxidant gas toward the cathode pole 51b, and an anode-side gas passage 51e is provided at the outside of the anode pole 51d for feeding supply hydrogen H as fuel gas toward the anode pole 51d. The inlet and outlet of the cathode-side gas passage 51a are connected to the air supply section 52, and the inlet and outlet of the anode-side gas passage 51e are connected to the hydrogen supply section 53. Although the fuel cell 1 shown in FIG. 12 is illustrated as a single cell for the purpose of simplifying the configuration, the fuel cell 51 is actually configured as a laminate structure having approximately 200 single cells laminated. Since the fuel cell 51 generates heat by the electrochemical reaction when generating electricity, a non-shown cooling device is employed for cooling the fuel cell 51.

In the fuel cell 1, supply air A is fed through the cathode-side gas passage 51a and supply hydrogen H is fed through the anode-side gas passage 51d such that the protons produced at the anode pole 51d by the ionization of hydrogen in the presence of the catalyst are migrated in the electrolyte membrane 51c and reach the cathode pole 51b. The protons reaching to the cathode pole 51b react with the oxygen ions produced from oxygen of the supply air A, thereby producing water. The produced water and supply air A containing unused oxygen is discharged as discharged air Ae from the outlet of the cathode of the fuel cell 51. The discharged air Ae contains a lot of moisture. At the time of ionization of hydrogen, electrons e⁻ are produced in the anode pole 51d. The produced electrons e⁻ reach the cathode pole 51b via an external load M such as a motor.

As best seen in FIG. 11, the air supply section 52 comprises an air compressor 71 as a compressor defined in the claims, a bypass valve 72, an intercooler 73, a restriction valve 74, a cathode humidifier 75, a cathode backpressure valve 76, etc. Of these elements, the intercooler 73 is arranged in a main passage W3 extending between the bypass valve 72 and the cathode backpressure valve 76. The intercooler 73 is furnished with a radiator 73A which cools cooling water to be circulated for cooling the supply air A. The restriction valve 74 is arranged in a bypass passage W4 bypassing the intercooler73. Arranged between the intercooler 73 and the cathode humidifier 75 is the heat exchanger 55. With this configuration, supply gas flowing through the bypass passage W4 does not flow to the intercooler 73. The cross-sectional area of the bypass passage W4 is smaller than that of the main passage W3. Therefore, pressure of supply air A at the discharge side of the air compressor 71 becomes higher when flowing through the bypass passage W4 than when flowing through the main passage W3. As a result, temperature of supply air A rises higher. Preferably, the cross-sectional area of the bypass passage W4 is set ½ or less of that of the main passage W3. The air supply section 52 is provided with temperature sensors T4 to T7 for detecting temperatures of supply air A, cooling water supplied to the intercooler 73, and the like.

The air compressor 71 is mainly consists of a supercharger (not shown) and a motor (not shown) for driving the supercharger. Supply air A passes through a non-shown air cleaner for removal of impurities or contaminants contained in the air, and flows into the air compressor 71. The air compressor 71 applies adiabatic compression to supply air A that is used in the fuel cell as oxidant gas, and feeds the compressed air under pressure toward the fuel cell 1. During adiabatic compression, supply air A is heated. The heated supply air A contributes to warming-up of the fuel cell 1.

The bypass valve 72 consists of a passage switching valve, and switches a flow of supply air A between the main passage W3 and the bypass passage W4 on the basis of a changeover signal outputted from the controller 54.

The intercooler 73 is furnished with a cooling water channel, through which cooling water flows. During the normal driving of the fuel cell 51, the intercooler 73 cools supply air A from the air compressor 71 by heat exchange between cooling water and supply air A. The radiator 73A is connected to the intercooler 73. The radiator 73A cools cooling water, the temperature of which rises due to heat caused upon cooling supply air A at the intercooler 73, for example, with a cooling fan. The temperature of supply air A that is fed from the air compressor 71 during the normal driving of the fuel cell 51 is usually about 120° C. However, the fuel cell 51 is driven in the temperature range of about 80 to 90° C. For this reason, supply air A is cooled down to a temperature of about 60 to 75° C., and then introduced into the fuel cell 51.

The restriction valve 74 is an opening degree adjustable valve, which adjusts the opening degree thereof. Adjusting the opening degree of the restriction valve 74 allows the bypass passage W4 through which supply air A flows to decrease a part of its diameter.

The cathode humidifier 75 is a fuel cell discharged gas supplying type, and substantially consists of a housing and a bundle of hollow fiber membranes made by a number of, for example, 5000 hollow fiber membranes bound together and accommodated in the housing. Supply air A flows within the hollow fiber membranes, and discharged air Ae flows outside the hollow fiber membranes within the housing. Since water is produced in the fuel cell 51 upon generation of electricity and discharged air Ae contains a lot of water or moisture, supply air A is humidified by moisture exchanging with the water. As the cathode humidifier 75, any known device may be used other than this fuel cell discharged gas supplying type. For example, one known humidifier (a kind of carburetor) comprises a venturi, a water tank, a siphon tube connecting the venturi and the water tank, etc, and supply air A is humidified by water, which is stored in the water tank for the purpose of humidifying air A and is drawn by Venturi effect for spraying the same.

The cathode backpressure valve 76 consists of a butterfly valve (not shown) and a stepping motor (not shown) for driving the butterfly valve, etc. The cathode backpressure valve 76 controls pressure (discharge pressure) of discharged air Ae that is discharged from the fuel cell 51 by decreasing or increasing the opening degree of the cathode backpressure valve 76. Decreasing the opening degree of the cathode backpressure valve 76 allows the fuel cell 51 to increase its discharge pressure, and therefore, the temperature rising range of discharged air Ae increases proportionally to the increasing discharge pressure. Meanwhile, increasing the opening degree of the cathode backpressure valve 76 allows the fuel cell 51 to decrease its discharge pressure, and therefore, the temperature rising range of discharged air Ae decreases proportionally to the decreasing discharged pressure.

Each of the temperature sensors T4 to T7 comprises a thermistor and the like. Of these temperature sensors, the temperature sensor T4 detects temperature of supply air A at the inlet of the cathode of the fuel cell 51, the temperature sensor T5 detects temperature of discharged air Ae at the outlet of the cathode of the fuel cell 51, the temperature sensor T6 detects temperature of cooling water that is supplied from the radiator 73A to the intercooler 73, and the temperature sensor T7 detects temperature of supply air A that is fed to the heat exchanger 55. Each temperature sensor T4 to T7 transmits a detection signal to the controller 54. A warm-up state of the fuel cell 51 is determined based on the temperature Te5 of discharged air Ae detected with the temperature sensor T5. Furthermore, ambient temperature is determined based on the temperature Te6 of cooling water detected at the intercooler 73 with the temperature sensor T6.

As shown in FIG. 11, the hydrogen supply section 53 comprises an anode supply device 81, an anode circulation device 82, an anode humidifier 83, etc.

The anode supply device 81 comprises, for example, a hydrogen gas cylinder and a regulator. The hydrogen gas cylinder consists of a non-shown high-pressure hydrogen bomb, and stores supply hydrogen H to be introduced to the anode of the fuel cell 51. Stored supply hydrogen H is pure hydrogen, and the pressure thereof ranges from 15 to 20 MpaG (150–200 kg/cm$^2$G). The hydrogen gas cylinder may be made from hydrogen absorbing alloys, and may store hydrogen at a pressure of about 1 MPaG (10 kg/cm$^2$G). The regulator comprises a diaphragm (not shown), a pressure regulating spring (not shown) and the like. The regulator is a pressure control valve for decreasing pressure of supply hydrogen H that is stored at a high pressure to a predetermined pressure so as to enable the use of supply hydrogen H under a certain constant pressure.

The anode circulation device 82 consists of, for example, a hydrogen circulating pump. This hydrogen circulating pump consists of a non-shown ejector and the like. The hydrogen circulating pump utilizes a flow of supply hydrogen H flowing toward the anode of the fuel cell 51 so as to absorb spent supply hydrogen H after the use in the fuel cell 51 as fuel gas, viz. discharged hydrogen He discharged from the anode of the fuel cell 51, and circulates the spent supply hydrogen H. The reason for circulating and utilizing discharged hydrogen He is that supply hydrogen H stored in the hydrogen gas cylinder of the anode supply device 81 is pure hydrogen.

The controller 54 comprises a CPU, a memory, an input/output interface, an A/D converter, a bus, etc. The controller entirely and systematically controls the fuel cell system FCS as well as controls temperature of supply air A to be fed to the fuel cell 51. As mentioned above, the controller 54 receives detection signals from the temperature sensors T4 to T7. The controller 54 also transmits control signals with respect to the air compressor 71, the bypass valve 72, the restriction valve 74, and the cathode backpressure valve 76. In this second embodiment, the controller 54 switches the bypass valve 72, and adjusts the opening degree of the restriction valve 74, so that a flow of supply air A from the air compressor 71 is switched between the main passage W3 and the bypass passage W4. When supply air A flows through the bypass passage W4, the opening degree of the restriction valve 74 is adjusted to adjust temperature of supply air A. Therefore, the bypass valve 72 and the restriction valve 74 form a heat quantity adjustment device defined in the claims.

The heat exchanger 55 is arranged between an air passage and a hydrogen passage. The air passage extends from the air compressor 71 to the cathode of the fuel cell 51, and the hydrogen passage extends from the anode supply device 81 to the anode of the fuel cell 51. The heat exchanger 55 comprises an air flow passage for feeding supply air A and a hydrogen flow passage for feeding supply hydrogen H, and heat of supply air A flowing through the air flow passage is transmitted to supply hydrogen H flowing through the hydrogen flow passage.

Figure 13:
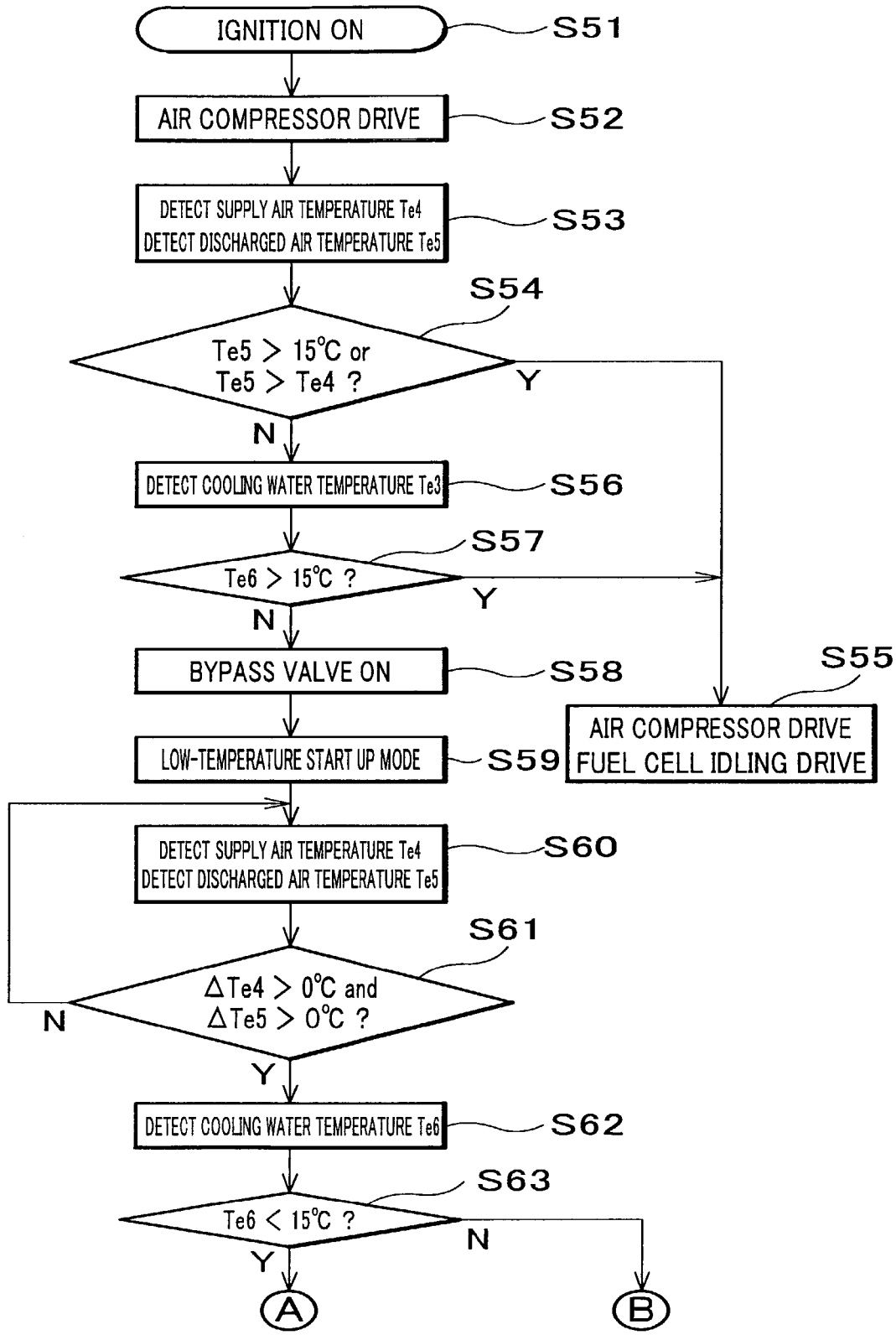
FIG. 13 is a flow chart partly showing a series of control flows of the warm-up apparatus according to the second embodiment.
Figure 14:
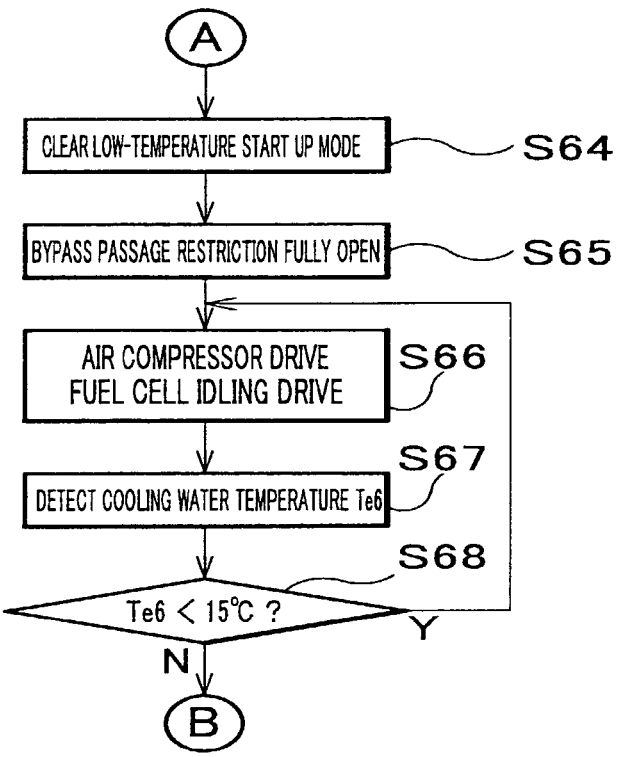
FIG. 14 is a flow chart showing other part of a series of control flows of the warm-up apparatus according to the second embodiment.

With reference to FIG. 13, one operation example at start up of the warm-up apparatus GS6 according to the second embodiment will be described (see also FIG. 11 when necessary).

Herein, FIG. 13 is a flow chart partly showing a series of control flows of the warm-up apparatus according to the second embodiment. The target temperature of supply air A to be fed to the fuel cell 51 is in the range of between 65° C. and 80° C.

In order to start up the fuel cell, when the ignition switch is ON (S51), the air compressor 71 is actuated (S52). Upon actuating the air compressor 71, the temperature of supply air A at the inlet of the fuel cell 51 and the temperature of discharged air Ae at the outlet of the fuel cell 51 are detected with the temperature sensors T4, T5 (S53). Subsequently, a determination is made as to whether the temperature Te5 of discharged air Ae detected with the temperature sensor T5 is higher than 15° C., and at the same time, a determination is made as to whether the temperature Te5 of discharged air Ae is higher than the temperature Te4 of supply air A. If the temperature Te5 of discharged air Ae is higher than 15° C., it is determined that the fuel cell 51 has been warmed up and the fuel cell 51 does not require a warm-up. Meanwhile, if the temperature Te5 is higher than the temperature Te4 of supply air A, it is also determined that the fuel cell 51 has been warmed up and the fuel cell 51 does not require a warm-up. Therefore, when either one of the above conditions is satisfied, i.e. the temperature Te5 is higher than 15° C. or the temperature Te5 is higher than the temperature Te4, it is determined that the fuel cell 51 does not require a warm-up. In this event, idling drive of the fuel cell 51 is started (S55) while continuously driving the air compressor 71. These operations are carried out just after turning on the ignition switch.

Meanwhile, in step S54, if the detected temperature Te5 of discharged air Ae is equal to or lower than 15° C. and the detected temperature Te5 of discharged air Ae is equal to or lower than the temperature Te4 of supply air A, the temperature of cooling water at the intercooler 73 is detected with the temperature sensor T6 (S56). Now, the temperature of cooling water is considered as being substantially equal to the temperature of ambient air. However, if the temperature of cooling water is higher than 15° C., it is determined that a warm-up of the fuel cell 51 is unnecessary. For this reason, a determination is made as to whether the temperature Te6 of cooling water is higher than 15° C. (S57). As the result, if the temperature Te6 is higher than 15° C., it is determined that the fuel cell 51 does not require a warm-up. And idling drive of the fuel cell 51 is started (S55) while continuously driving the air compressor 71. Meanwhile, in step S57, if the detected temperature Te6 is equal to or lower than 15° C., the bypass valve 72 switches to ON (S58) to proceed into a low-temperature start up mode (S59), so that supply air A from the air compressor 71 is fed through the bypass passage W4. A flow of supply air A is switched between the main passage W3 and the bypass passage W4, and supply air A flows through the bypass passage W4 when the bypass valve 72 is ON, and supply air A flows through the main passage W3 when the bypass valve 72 is OFF. When supply air A flows through the bypass passage W4, supply air A bypasses the intercooler 73 and flows into the fuel cell 51. Since supply air A bypassing the intercooler 73 is not cooled by the intercooler 73, air warmed at the air compressor 71 is directly fed to the fuel cell 51.

Herein, supply air A that is fed to the fuel cell 51 passes through the heat exchanger 55. Also, supply hydrogen H that is fed to the anode of the fuel cell 51 flows through the heat exchanger 55. Now, the temperature of supply hydrogen H is substantially equal to the temperature of supply air A prior to being warmed up by the air compressor 71, and is lower than the temperature of supply air A after being warmed up. Usually, the flow rate of supply hydrogen H is extremely low when compared with the flow rate of supply air A. Since both supply air A and supply hydrogen H pass through the heat exchanger 55, heat of supply air A is transmitted to supply hydrogen H, so that supply hydrogen H is warmed up to a temperature substantially equal to the supply air A. For this reason, supply air A is required to have a heat quantity sufficient to warm up supply hydrogen H, and therefore, supply air A is warmed up to a temperature higher than 65 to 80° C., of which temperature supply air A is fed to the fuel cell 51.

Accordingly, supply air A is fed to the cathode of the fuel cell 51 and supply hydrogen H is fed to the anode of the fuel cell 51 while the air compressor 71 warms up supply air A and supply hydrogen H is warmed up with heat of supply air A. This enables warming-up of the devices not only in the cathode system but also in the anode system. Also, this enables warming-up for both the cathode and the anode to thereby warm up the whole fuel cell 51 uniformly and quickly. Therefore, it ispossible to decrease time required for warming up the fuel cell 51 to perform a desired electricity generation capacity. The fuel cell 51 is therefore warmed up quickly. In the low-temperature start up mode, the air compressor 71 is driven with an electric power (e.g. 5 kW) greater than required during the normal idling (e.g. 500W) so as to increase heating amount of supply air A due to adiabatic compression of the air compressor 71. Furthermore, opening degree of the restriction valve 74 is each time determined based on, for example, temperature of supply air A just before being fed to the fuel cell 51 and detected with the temperature sensor T4.

During the low-temperature start up mode, the temperature Te4 of supply air A just before flowing into the fuel cell 51 is detected with the temperature sensor T4, and the temperature Te5 of discharged air Ae discharged from the fuel cell 51 is detected with the temperature sensor T5 (S60). And the supply air elevated temperature ΔTe4 compared with the previous temperature of supply air A that was fed to the fuel cell 51 last time is calculated, and the discharged air elevated temperature ΔTe5 compared with the previous temperature of discharged air Ae that was discharged from the fuel cell 51 last time is calculated. Subsequently, a determination is made as to whether each of the supply air elevated temperature ΔTe4 and the discharged air elevated temperature ΔTe5 is higher than 0° C. (S61). If either one of the supply air elevated temperature ΔTe4 and the discharged air elevated temperature ΔTe5 is equal to or lower than 0° C., the operation returns to step S59 to carry out continuously the low-temperature start up mode.

Meanwhile, when both the supply air elevated temperature ΔTe4 and the discharged air elevated temperature ΔTe5 are higher than 0° C., the temperature Te6 of cooling water at the intercooler 73 is then detected with the temperature sensor T6 (S62). And a determination is made as to whether the temperature Te6 is lower than 15° C. (S63). As the result, if the temperature Te6 is lower than 15° C., supply air A is not fed to the intercooler 73 to prevent supply air A from being too cooled due to the intercooler 73 that is not warmed up yet. For this reason, after the low-temperature start up mode is cleared (S64), the restriction of the restriction valve 74 is wholly open (S65) to make supply air A bypass the intercooler 73, and all supply air A is fed through the bypass passage W4. And idling drive of the fuel cell 51 is started (S66) while continuously driving the air compressor 71. In this event, the air compressor 71 is driven, for example, by electric power of 500 W.

Figure 15:
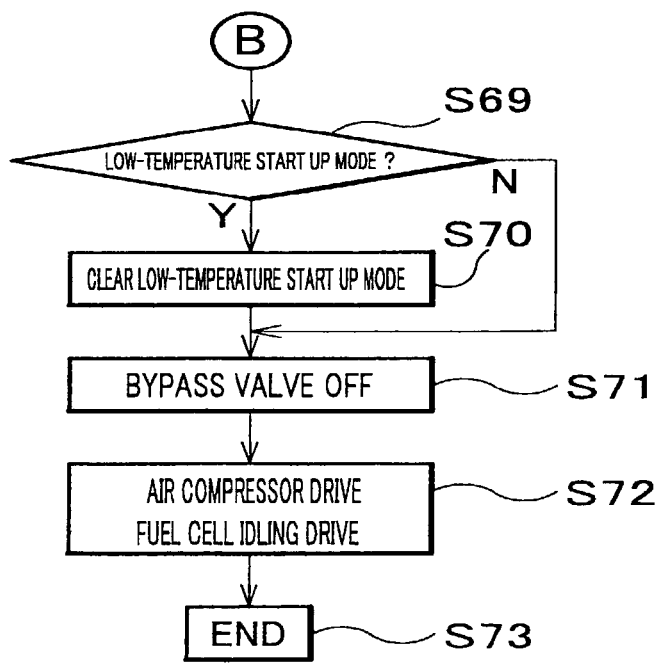
FIG. 15 is a flow chart showing the rest of a series of control flows of the warm-up apparatus according to the second embodiment.

Subsequently, the temperature Te6 of cooling water at the intercooler 73 is detected with the temperature sensor T6 (S67), and a determination is made as to whether the temperature Te6 is lower than 15 ° C. (S68). If the temperature Te6 is less than 15° C., the operation returns to step S66 to carry out continuously the idling drive of the fuel cell 51. Such a feedback control is repeated and the same operation is carried out until the temperature Te6 of cooling water is equal to or greater than 15° C. On the contrary, if the temperature Te6 is equal to or greater than 15° C., it is determined that the intercooler 73 is ready, and the operation proceeds to step S69 shown in FIG. 15.

Meanwhile, in step S63, if the detected temperature Te6 of cooling water at the intercooler 73 is equal to or greater than 15° C., it is determined that the intercooler 73 is not cool, and the operation proceeds to step S69.

In step S69, a determination is made as to whether or not the fuel cell 51 is in the low-temperature start up mode. As the result of the determination, if not in the low-temperature start up mode, the operation skips step S70 and then proceeds to step S71. However, if the low-temperature start up mode is determined in step S69, the low-temperature start up mode is cleared (S70). When the low-temperature start upmode is cleared, the bypass valve 72 is switched to OFF (S71) so that supply air A from the air compressor 71 flows through the main passage W3. Supply air A flowing through the main passage W3 is adjusted to a predetermined temperature at the intercooler 73 and then fed to the fuel cell 51. And idling drive of the fuel cell 51 is carried out (S72) while continuously driving the air compressor 71. The warm-up of the fuel cell 51 is then completed (S73).

As mentioned above, according to the second embodiment, supply air A that is warmed by the air compressor 71 and fed to the cathode of the fuel cell 51 as well as supply hydrogen H that is fed to the anode of the fuel cell 51 are respectively flown through the heat exchanger 55. At the heat exchanger 55, heat of supply air A is transmitted to supply hydrogen so that the supply hydrogen H is warmed up. Accordingly, supply hydrogen H passing through the heat exchanger 55 enables a warm-up of the anode circulation device 82 and the anode humidifier 83. Furthermore, it is possible to warm up directly the anode of the fuel cell 51 without transmitting heat through the cathode of the fuel cell 51. Therefore, it is possible to warm up the whole fuel cell 51 quickly.

Upon determining completion of the warm-up of the fuel cell 51, in addition to the temperature of discharged air Ae discharged from the fuel cell 51, the temperature of ambient air maybe measured with a non-shown temperature sensor, for example, provided at the inlet of the air compressor 71, and the bypass valve 72 may be controlled based on the temperature of ambient air. When ambient air is low in temperature, in order to increase the temperature of supply air A to a desired temperature with respect to the fuel cell 51, it is necessary to increase heat quantity that is given to supply air A. For this reason, when the temperature of ambient air is low, a control is made such that flow rate of supply air A flowing through the bypass passage W4 increases. On the contrary, when the temperature of ambient air is high, a control is made such that flow rate of supply air A flowing through the main passage W3 increases. Therefore, the temperature of supply air A is adjusted to a desired temperature.

A warm-up operation during the normal driving will be described. Since the warm-up operation in the normal driving is carried out by the warm-up apparatus GS6 illustrated in FIG. 11, a reference is also made to FIG. 11 when necessary.

Figure 16A:
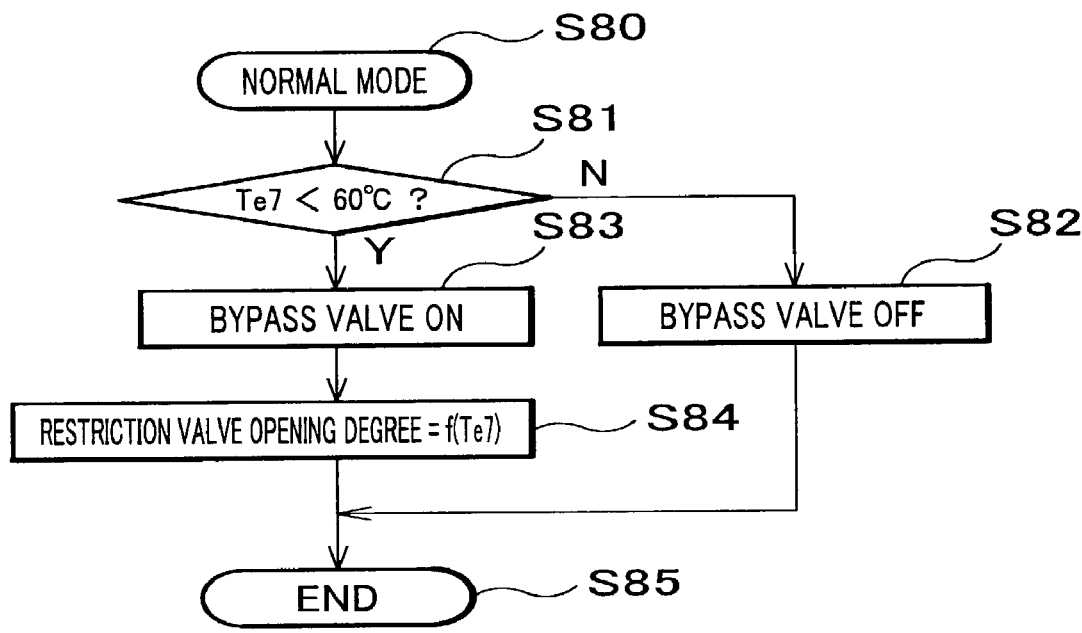
FIG. 16A is a flow chart showing a warm-up operation in the normal mode.

FIG. 16A is a flow chart showing a warm-up operation in the normal mode.

As shown in FIG. 16A, when the fuel cell 51 is in the normal mode (S80), the temperature Te7 of supply air A that is fed to the heat exchanger 55 is detected with the temperature sensor T7, and a determination is made as to whether the temperature Te7 is lower than 60° C. (S81). When the fuel cell 51 is in the normal mode, the bypass valve 72 is OFF to cool supply air A by means of the intercooler 73, so that supply air A flows through the main passage W3. Herein, if the temperature Te7 is lower than 60° C., it is impossible to supply the fuel cell 51 with supply air A in the optimum temperature range of between 65° C. and 80° C. Meanwhile, in step S81, if the temperature Te7 is equal to or higher than 60° C., supply air A having a temperature within the optimum temperature range will be fed to the fuel cell 51. Therefore, the bypass valve 72 remains OFF (S82), and the operation is completed while supply air A is flowing through the main passage W3.

Figure 16B:
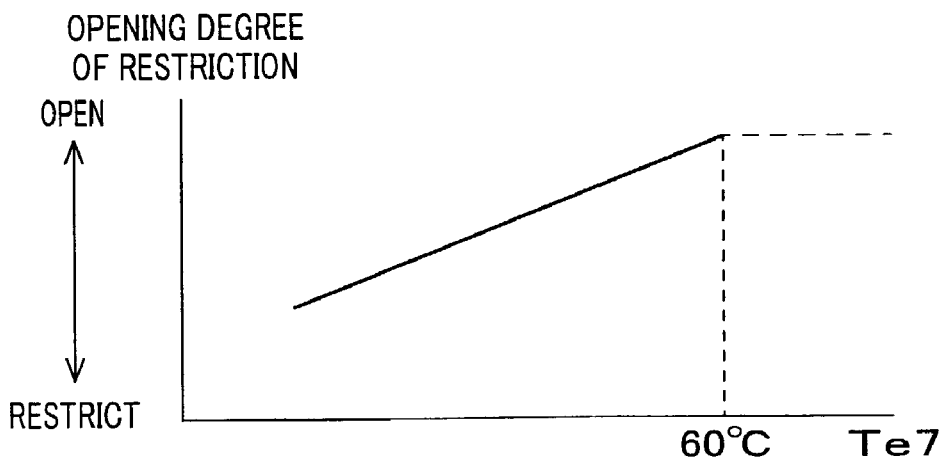
FIG. 16B is a graph showing the relations between temperature of supply air at a cathode humidifier and opening degree of a restriction valve.

If the temperature Te7 of supply air A detected with the temperature sensor T7 is lower than 60° C., since the fuel cell 51 requires warm supply air A, the bypass valve 72 is switched to ON (S83) to feed supply air A through the bypass passage W4. Since supply air A flowing through the bypass passage W4 is fed to the fuel cell 51 bypassing the intercooler 73, warm supply air is fed to the fuel cell 51. Furthermore, upon feeding supply air A through the bypass passage W4, pressure of the air compressor 71 at the outlet is adjusted by the restriction valve 74 arranged in the bypass passage W4. In this event, opening degree of the restriction valve 74 is determined from a function f(Te7) (S84), in which the temperature Te7 of supply air A just before flowing into the inlet of the heat exchanger 55 is considered as a parameter. The function utilized for this purpose is shown in FIG. 16B. As shown in FIG. 16B, in the region where supply air A just before flowing into the heat exchanger 55 has a temperature Te7 lower than 60° C., the opening degree of the restriction valve 74 becomes smaller as the temperature Te7 of the supply air A becomes lower. The smaller the opening degree of the restriction valve 74, the higher the pressure of supply air A at the outlet of the air compressor 71, which leads to increasing temperature of supply air A. Therefore, it is possible to raise the temperature of supply air A that is fed to the fuel cell 51.

The opening degree of the restriction valve 74 becomes greater as the temperature Te7 increases to 60° C. The greater the opening degree of the restriction valve 74, the smaller the pressure of supply air A at the outlet of the air compressor 71, which leads to decreased temperature rising range of supply air A. Therefore, it is possible to control supply air A to a desired temperature for supplying to the fuel cell 51.

After carrying out the aforementioned control, the warm-up operation of the fuel cell 51 in the normal mode is completed (S85). Accordingly, a warm-up of the fuel cell 51 is carried out during the normal driving of the fuel cell 51.

Modification of Second Embodiment

A modification of the second embodiment will be described. Parts or elements similar to those previously described regarding the second embodiment will be denoted by the same reference numerals and description thereof will be omitted.

Figure 17:
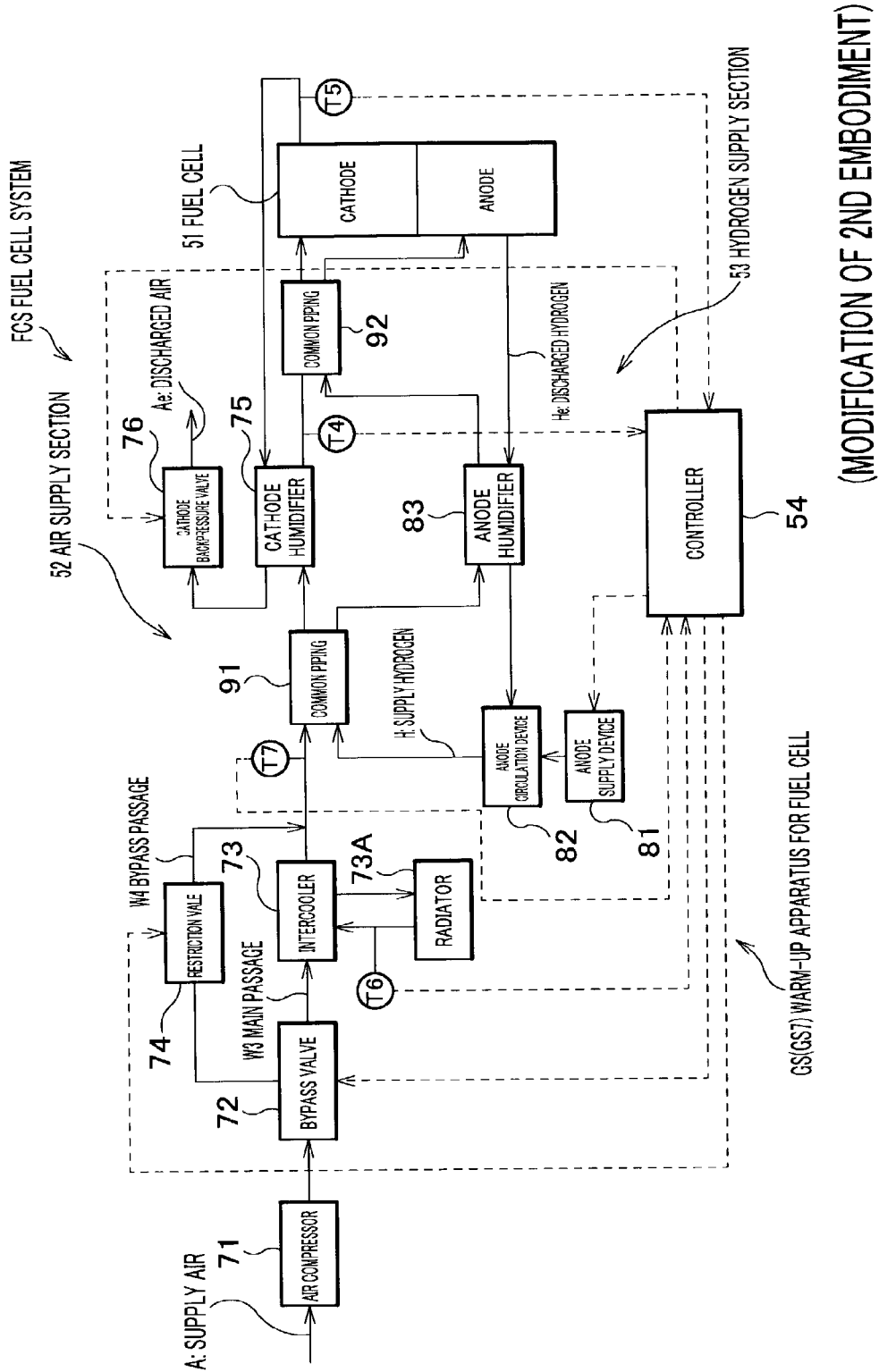
FIG. 17 is the overall arrangement of a fuel cell system including a warm-up apparatus for the fuel cell according to a modification of the second embodiment.

Herein, FIG. 17 is the overall arrangement of a fuel cell system including a warm-up apparatus for the fuel cell according to a modification of the second embodiment.

As shown in FIG. 17, the warm-up apparatus GS7 for the fuel cell has substantially the same configuration as the warm-up apparatus GS6 according to the second embodiment shown in FIG. 11. However, according to the warm-up apparatus GS7, as shown in FIG. 17, a first and second common piping 91, 92 are employed in placed of the heat exchanger 55 in the second embodiment shown in FIG. 11. In this modification, these common piping 91, 92 functions as a heat exchanger where heat of supply air is transmitted to supply hydrogen.

Likewise the second embodiment, switching between the main passage W3 and the bypass passage W4 is carried out with the bypass valve 72. Also, likewise the second embodiment, adjusting the opening degree of the restriction valve 74 provided in the bypass passage W4 enables to vary the cross-sectional area of the bypass passage W4 and hence to adjust pressure of the air compressor 71 at the outlet, thereby adjusting temperature of supply air A.

In this modification, supply air A from the air compressor 71 is introduced into the fist common piping 91 via the intercooler 73. Supply air A flowing out from the first common piping 91 is introduced through the cathode humidifier 75 and into the second common piping 92. Supply air A flowing out from the second common piping 92 is fed to the cathode of the fuel cell 51. Discharged air Ae discharged from the cathode of the fuel cell 51 flows along the same flow passage as the second embodiment.

Meanwhile, supply hydrogen H from the anode supply device 81 is introduced through the anode circulation device 82 into the first common piping 91. The cross-section of the first common piping 91 is shown in FIG. 18. As shown in FIG. 18, the first common piping 91 has a double piping structure, in which supply hydrogen flows through a hydrogen flow passage HF formed within the inner tube 91A. Formed between the outer surface of the inner tube 91A and the inner surface of the outer tube 91B is an air flow passage AF, through which supply air flows. The first common piping 91 has a simple double piping structure, and supply air and supply hydrogen flow parallelly in the same flow direction within the air flow passage AF and the hydrogen flow passage HF, so that heat of supply air A is transmitted to supply hydrogen H. According to this modification, supply air A and supply hydrogen flow parallelly in the same direction. However, of course, supply air A and supply hydrogen may flow in the counter direction.

Supply hydrogen H flowing out from the first common piping 91 is introduced through the anode humidifier 83 into the second common piping 92. As shown in FIG. 18, likewise the first common piping 91, the second common piping 92 includes an inner tube 92A and an outer tube 92B. A hydrogen flow passage HF is formed within the inner tube 92A for feeding supply hydrogen H, and an air flow passage AF is formed between the outer surface of the inner tube 92A and the inner surface of the outer tube 92B for feeding supply air. With such a constitution, heat is transmitted from supply air to supply hydrogen while supply air and supply hydrogen flow through the respective flow passages.

Supply air flowing out from the second common piping 92 is fed to the anode of the fuel cell 51. Discharged hydrogen He discharged from the anode of the fuel cell 51 is introduced into the anode circulation device 82 for recycling.

Likewise the second embodiment, the warm-up apparatus GS7 according to this modification controls the bypass valve 72 and the restriction valve 74 on the basis of each temperature signal outputted from the temperature sensors T4 to T7. For this reason, likewise the second embodiment, by supplying the fuel cell 51 with supply air A and supply hydrogen H each having an appropriate temperature, not only devices in the cathode system but also devices in the anode system are warmed up, and the cathode and the anode of the fuel cell 51 are quickly warmed up, thereby completing warming-up of the whole fuel cell 51 quickly without requiring a dedicated electric heater or hydrogen-combustion heater.

Furthermore, according to this modification, since heat of supply air A is transmitted to supply hydrogen H with the use of the common piping 91, 92, it is possible to reduce the size of the whole apparatus when compared with the second embodiment utilizing the heat exchanger 55.

While the invention has been described in detail and with reference to the second embodiment and modification thereof, it will be apparent to one skilled in the art that various changes and modifications can be made therein without departing from the spirit and scope thereof.

For example, in the aforementioned examples, control of the bypass valve and restriction valve is carried out on the basis of the temperature of supply air flowing to the fuel cell 51 and the temperature of cooling water at the cooler of the intercooler. Meanwhile, a condition of the fuel cell is detected based on the amount of electricity generation generated at the fuel cell, and by this condition, temperatures of supply air and supply hydrogen that are fed to the fuel cell may be controlled. To be more specific, for example, amount of hydrogen consumption increases as amount of electricity generation of the fuel cell increases, and the amount of supply hydrogen to the fuel cell increases as well. Therefore, in order to provide such a lot of hydrogen with heat, heat quantity of air is increased by way of increasing flow rate of air that flows through the bypass passage. On the contrary, if the amount of electricity generation generated at the fuel cell is small, the amount of hydrogen consumption is small, and thus, a few amount of hydrogen requires heat. Therefore, since air requires a small amount of heat, the amount of air flowing through the main passage is increased. Accordingly, it is possible to feed air and hydrogen each having a desired temperature to the fuel cell. The amount of electricity generation generated at the fuel cell is detected, for example, with a non-shown ECU.

Furthermore, in the aforementioned examples, a bypass valve is used as a heat quantity adjustment device for switching between the main passage and the bypass passage. However, for example, a flow control valve may be employed for adjusting the amount of air flowing through the main passage and bypass passage.

Moreover, the hydrogen supply section is constructed such that hydrogen is fed from the hydrogen tank to the fuel cell. However, raw fuel liquid such as methanol may be used. In this instance, raw fuel liquid is reformed by a reformer to produce hydrogen-enriched fuel gas and then supplied to the fuel cell.

What is claimed is:

1. A warm-up apparatus for a fuel cell comprising:
an air supply section for feeding air to a cathode of the fuel cell, the air supply section including a compressor for compressing and conveying air, and an air passage connecting the compressor and the cathode of the fuel cell; and
a hydrogen supply section for feeding hydrogen to an anode of the fuel cell, the hydrogen supply section including a hydrogen passage connecting a hydrogen supply source and the anode of the fuel cell;
wherein said air passage includes a main passage and a bypass passage, the main passage being provided with an intercooler for cooling air flowing from the compressor to the fuel cell and the bypass passage bypassing the intercooler; and
wherein a heat exchanger is arranged between the air passage and the hydrogen passage so as to transfer the heat of air to hydrogen.

2. A warm-up apparatus for a fuel cell according to claim 1, wherein a heat quantity adjustment device is employed for adjusting a heat quantity of the air flowing to the fuel cell in such a manner that a supply of air is switched between the main passage and the bypass passage.

3. A warm-up apparatus for a fuel cell comprising:
an air supply section for feeding air to a cathode of the fuel cell, the air supply section including a compressor for compressing and conveying air, and an air passage connecting the compressor and the cathode of the fuel cell; and
a hydrogen supply section for feeding hydrogen to an anode of the fuel cell, the hydrogen supply section including a hydrogen passage connecting a hydrogen supply source and the anode of the fuel cell;
wherein a heat exchanger is arranged between the air passage and the hydrogen passage so as to transfer the heat of air to hydrogen.

4. A warm-up apparatus for a fuel cell according to claim 3, wherein said air passage includes a main passage, in which an intercooler for cooling air is provided, and a bypass passage, and wherein a heat quantity adjustment device is employed for adjusting a heat quantity of air flowing to the fuel cell in such a manner that a supply of air is switched between the main passage and the bypass passage.

5. A warm-up apparatus for a fuel cell according to claim 2, wherein a controller is provided for controlling said heat quantity adjustment device in accordance with a warming-up state of the fuel cell.

6. A warm-up apparatus for a fuel cell according to claim 2, wherein a controller is provided for controlling said heat quantity adjustment device in accordance with ambient temperature.

7. A warm-up apparatus for a fuel cell according to claim 2, wherein a controller is provided for controlling said heat quantity adjustment device in accordance with a generation of electricity at the fuel cell.

8. A warm-up apparatus for a fuel cell according to claim 1, wherein a restriction is provided in said bypass passage so that a degree of opening of said bypass passage is adjustable.

9. A warm-up apparatus for a fuel cell according to claim 2, wherein a restriction is provided in said bypass passage so that a degree of opening of said bypass passage is adjustable.

10. A warm-up apparatus for a fuel cell according to claim 1, wherein the heat exchanger is arranged in the hydrogen passage at an upstream of the fuel cell so as to transfer the heat of air to hydrogen to be fed to the fuel cell.

11. A warm-up apparatus for a fuel cell according to claim 3, wherein the heat exchanger is arranged in the hydrogen passage at an upstream of the fuel cell so as to transfer the heat of air to hydrogen to be fed to the fuel cell.

12. A warm-up apparatus fro a fuel cell according to claim 1, wherein the heat exchanger is arranged at an intermediate portion of the air passage between the compressor and the fuel cell so as to transfer the heat of air to be fed from the compressor to the fuel cell to hydrogen.

13. A warm-up apparatus for a fuel cell according to claim 3, wherein the heat exchanger is arranged at an intermediate portion of the air passage between the compressor and the fuel cell so as to transfer the heat of air to be fed from the compressor to the fuel cell to hydrogen.

14. A warm-up apparatus for a fuel cell according to claim 10, wherein the heat exchanger is arranged at an intermediate portion of the air passage between the compressor and the fuel cell so as to transfer the heat of air to be fed from the compressor to the fuel cell to hydrogen.

15. A warm-up apparatus for a fuel cell according to claim 11, wherein the heat exchanger is arranged at an intermediate portion of the air passage between the compressor and the fuel cell so as to transfer the heat of air to be fed from the compressor to the fuel cell to hydrogen.

* * * * *